United States Patent
Yeo et al.

(10) Patent No.: US 12,414,089 B2
(45) Date of Patent: Sep. 9, 2025

(54) METHOD AND DEVICE FOR TRANSMITTING OR RECEIVING CONTROL SIGNAL AND DATA SIGNAL IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Jinyoung Oh, Gyeonggi-do (KR); Taehyoung Kim, Gyeonggi-do (KR); Seho Myung, Gyeonggi-do (KR); Taehan Bae, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 521 days.

(21) Appl. No.: 17/761,332

(22) PCT Filed: Sep. 21, 2020

(86) PCT No.: PCT/KR2020/012730
§ 371 (c)(1),
(2) Date: Mar. 17, 2022

(87) PCT Pub. No.: WO2021/054810
PCT Pub. Date: Mar. 25, 2021

(65) Prior Publication Data
US 2022/0256538 A1    Aug. 11, 2022

(30) Foreign Application Priority Data
Sep. 20, 2019  (KR) .................. 10-2019-0116397

(51) Int. Cl.
*H04W 72/0446*    (2023.01)
(52) U.S. Cl.
CPC .............................. *H04W 72/0446* (2013.01)

(58) Field of Classification Search
CPC ..... H04L 5/001; H04L 5/0044; H04L 5/0053; H04L 5/0092; H04W 72/0446; H04W 72/1289
See application file for complete search history.

(56) References Cited

U.S. PATENT DOCUMENTS

| 10,735,171 B2 | 8/2020 | Yeo et al. | |
| 2015/0092703 A1* | 4/2015 | Xu | H04W 28/18 370/329 |

(Continued)

FOREIGN PATENT DOCUMENTS

| WO | WO 2017/196059 | 11/2017 |
| WO | WO 2019/117619 | 6/2019 |

(Continued)

OTHER PUBLICATIONS

CMCC. Discussion on cross-carrier scheduling with different numerologies. RI-1906527, 3GPP TSG RAN WGI #97. Reno, USA. May 2, 2019 (Year: 2019).*

(Continued)

*Primary Examiner* — Mehmood B. Khan
(74) *Attorney, Agent, or Firm* — The Farrell Law Firm, P.C.

(57) ABSTRACT

The present disclosure relates to a communication technique for combining an IoT technology with a 5G communication system for supporting a higher data transmission rate than a 4G system, and a system therefor. The present disclosure can be applied to intelligent services (for example, smart homes, smart buildings, smart cities, smart cars or connected cars, health care, digital education, retail businesses, security and safety-related services, and the like) on the basis of 5G communication technologies and IoT-related technologies. The present disclosure relates to a method of a terminal in a communication system, the method comprising the steps of: receiving carrier aggregation configuration information (Continued)

from a base station; receiving offset information for a frame boundary between a first cell and a second cell from the base station; receiving, from the base station, control information including time domain resource allocation information indicating an interval between a slot in which data scheduled by the control information transmitted or received and a slot in which the control information is received into the first cell; identifying an index of the slot in which the data is transmitted or received, on the basis of the offset information and the time domain resource allocation information; and transmitting the data to or receiving the data from the base station on the second cell in the slot of the identified index.

20 Claims, 12 Drawing Sheets

(56) References Cited

U.S. PATENT DOCUMENTS

| | | | |
|---|---|---|---|
| 2020/0053670 A1* | 2/2020 | Jung | ............... H04W 56/0015 |
| 2020/0280337 A1 | 9/2020 | Yi | |
| 2021/0037484 A1* | 2/2021 | Zhou | ................. H04W 52/386 |

FOREIGN PATENT DOCUMENTS

| | | | |
|---|---|---|---|
| WO | WO 2019/165224 | 8/2019 | |
| WO | WO-2019165224 A1 * | 8/2019 | ........... H04B 7/0626 |
| WO | WO-2021054810 A1 * | 3/2021 | ............. H04L 5/001 |

OTHER PUBLICATIONS

PCT/ISA/210 Search Report issued on PCT/KR2020/012730, Dec. 30, 2020, pp. 5.
PCT/ISA/237 Written Opinion issued on PCT/KR2020/012730, Dec. 30, 2020, pp. 4.
CMCC, 'Discussion on cross-carrier scheduling with different numerologies', R1-1906527, 3GPP TSG RAN WG1 #97, Reno, USA, May 2, 2019, pp. 2.
CMCC, 'Discussion on cross-carrier scheduling with different numerologies', R1-1900426, 3GPP TSG RAN WG1 Ad-Hoc Meeting 1901, Taipei, Jan. 12, 2019, pp. 9.
VIVO, 'Remaining aspects of cross-slot scheduling', R1-1908171, 3GPP TSG RAN WG1 #98, Prague, CZ, Aug. 17, 2019, pp. 9.
CMCC, Discussion on necessity of frame boundary alignment of NR CA, R1-1907746, 3GPP TSG RAN WG1 #97, Reno, USA, May 16, 2019, pp. 7.
Korean Office Action dated Mar. 27, 2025 issued in counterpart application No. 10-2019-0116397, 9 pages.

* cited by examiner

METHOD AND DEVICE FOR TRANSMITTING OR RECEIVING CONTROL SIGNAL AND DATA SIGNAL IN WIRELESS COMMUNICATION SYSTEM

PRIORITY

This application is a National Phase Entry of PCT International Application No. PCT/KR2020/012730, which was filed on Sep. 21, 2020, and claims priority to Korean Patent Application No. 10-2019-0116397, which was filed on Sep. 20, 2019, the entire content of each of which is incorporated herein by reference.

TECHNICAL FIELD

The disclosure relates to a method and device for transmitting and receiving a control signal and data signal in a wireless communication system. More specifically, the disclosure relates to a control signal and data signal transmission and reception operation in a carrier aggregation (CA) environment.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system (5th generation communication system or New Radio (NR)) to an IoT network have been undertaken. For example, 5G communication technologies such as a sensor network, machine to machine (M2M), and machine type communication (MTC) have been implemented by the technique of beamforming, MEMO, and array antenna. Application of a cloud RAN as the foregoing big data processing technology may be an example of convergence of 5G technology and IoT technology.

As various services may be provided according to the development of wireless communication systems and the above-mentioned technology, a method for smoothly providing these services is required.

DISCLOSURE OF INVENTION

Technical Problem

The disclosure provides a device and method for transmitting and receiving a signal between a terminal and a base station in a situation in which frame boundaries between carriers do not match in a carrier aggregation environment.

Solution to Problem

According to the disclosure, a method of a terminal of a communication system includes receiving carrier aggregation configuration information from a base station; receiving offset information on a boundary of a frame of a first cell and a second cell from the base station; receiving control information including time domain resource allocation information indicating an interval between a slot in which control information is received and a slot in which data scheduling the control information are transmitted and received on the first cell from the base station; identifying an index of the slot in which data are transmitted and received based on the offset information and the time domain resource allocation information; and transmitting and receiving the data in the slot of the identified index on the base station and the second cell.

According to the disclosure, a method of a base station of a communication system includes transmitting carrier aggregation configuration information to a terminal; transmitting offset information on a boundary of a frame of a first cell and a second cell to the terminal; transmitting control information including time domain resource allocation information indicating an interval between a slot in which control information is received on the first cell and a slot in which data scheduling the control information are transmitted and received to the terminal; and transmitting and receiving the data in a slot of an index identified based on the offset information and the time domain resource allocation information on the terminal and the second cell.

According to the disclosure, a terminal of a communication system includes a transceiver; and a controller configured to control to receive carrier aggregation configuration information from a base station, to receive offset information on a boundary of a frame of a first cell and a second cell from the base station, to receive control information including time domain resource allocation information indicating an interval between a slot in which control information is received on the first cell and a slot in which data scheduling the control information are transmitted and received from the base station, to identify an index of a slot in which the data are transmitted and received based on the offset information and the time domain resource allocation information, and to transmit and receive the data in a slot of the identified index on the base station and the second cell.

According to the disclosure, a base station of a communication system includes a transceiver; and a controller configured to control to transmit carrier aggregation configuration information to a terminal, to transmit offset information on a boundary of a frame of a first cell and a second cell to the terminal, to transmit control information including tine domain resource allocation information indicating an interval between a slot in which control information is received on the first cell and a slot in which data scheduling the control information are transmitted and received to the terminal, and to transmit and receive the data in a slot of an index identified based on the offset information and the time domain resource on the terminal and the second cell.

Advantageous Effects of Invention

Embodiments described in the disclosure provide a device and method for effectively providing a service in a mobile communication system.

MODE FOR THE INVENTION

Figure 1:
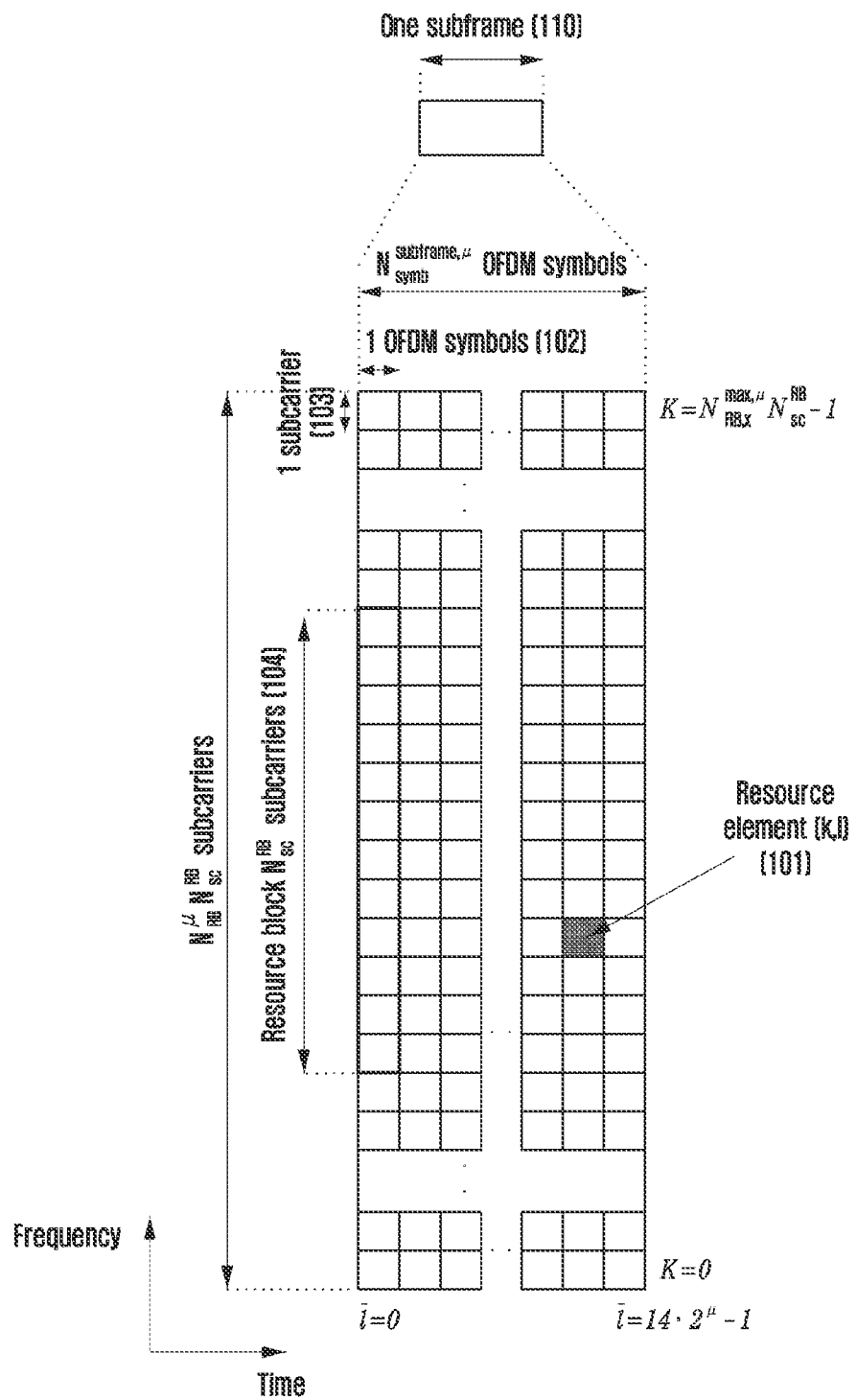
FIG. 1 is a diagram illustrating a basic structure of a time-frequency domain in a 5G system.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification. Further, in the description of the disclosure, when it is determined that a detailed description of a related function or configuration may unnecessarily obscure the subject matter of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, a base station is a subject performing resource allocation of a terminal, and may be at least one of a gNode B, an epode B, a node B, a base station (BS), a radio access unit, a base station controller, or a node on a network. The terminal may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a terminal, and an uplink (UL) is a wireless transmission path of a signal transmitted from a terminal to a base station. Hereinafter, although LTE or LTE-A system may be described as an example, embodiments of the disclosure may be applied to other communication systems having a similar technical background or channel type. For example, embodiments of the disclosure may include 5G mobile communication technology (5G, new radio (NR)) developed after LTE-A, and the following 5G may be a concept including existing LTE, LTE-A and other similar services. Further, the disclosure may be applied to other communication systems through some modifications within a range that does not significantly deviate from the scope of the disclosure by the determination of a person having skilled technical knowledge.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the message flow diagram block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in an embodiment, '-unit' may include one or more processors.

A wireless communication system has evolved from providing voice-oriented service the early days to a broadband wireless communication system that provides high-speed and high-quality packet data services such as communication standards such as high speed packet access (HSPA), long term evolution (LTE) or evolved universal terrestrial radio access (E-UTRA), LTE-Advanced (LIE-A), and LTE-Pro of 3GPP, high rate packet data (HRPD), ultra mobile broadband (UMB) of 3GPP2, and IEEE 802.16e.

As a representative example of the broadband wireless communication system, an LTE system employs an orthogonal frequency division multiplexing (OFDM) scheme in a downlink (DL) and a single carrier frequency division multiple access (SC-FDMA) scheme in an uplink. The uplink means a radio link in which a user equipment (UE) or a mobile station (MS) transmits data or control signals to an eNode B (eNB) or a base station (BS), and the downlink means a wireless link in which a base station transmits data or control signals to a terminal. Further, the above-mentioned multiple access method enables data or control information of each user to distinguish by allocating and operating data or control information so that time-frequency resources to carry data or control information for each user in general do not overlap each other, that is, so that orthogonality is established.

A 5G communication system, which is a communication system after LTE, should support services that simultaneously satisfy various requirements so that various requirements of users and service providers can be freely reflected. Services considered for the 5G communication system include enhanced mobile broadband (eMBB), massive machine type communication (mMTC), ultra reliability low latency communication (URLLC), and the like.

The eMBB aims to provide more improved data transfer rates than data transfer rates supported by existing LTE, LTE-A, or LTE-Pro. For example, in the 5G communication system, the eMBB should be able to provide a peak data rate of 20 Gbps in a downlink and a peak data rate of 10 Gbps in an uplink from the viewpoint of one base station. Further, the 5G communication system should provide an increased user perceived data rate of a terminal while providing a peak data rate. In order to satisfy such requirements, it may be required to improve various transmission and reception technologies, including more advanced multi-input and multi-output (MIMO) transmission technology. Further, the LTE system transmits a signal using a transmission bandwidth of up to 20 MHz in the 2 GHz band, whereas the 5G communication system can satisfy a data transmission rate required by the 5G communication system by using a frequency bandwidth wider than 20 MHz in a frequency band of 3 to 6 GHz or 6 GHz or more.

At the same time, mMTC is being considered to support application services such as Internet of Thing (IoT) in the 5G communication system. In order to efficiently provide Internet of Things, mMTC requires access support for large-scale terminals within a cell, improvement of coverage of terminals, an improved battery time, and cost reduction of terminals. Because the Internet of Things is attached to various sensors and various devices to provide communication functions, it should be able to support a large number of terminals (e.g., 1,000,000 terminals/$km^2$) within a cell. Further, because a terminal supporting mMTC is highly likely to be located in a shaded area that a cell cannot cover, such as the basement of a building, due to the nature of the service, the terminal may require wider coverage compared to other services provided by the 5G communication system. The terminal supporting mMTC should be configured with a low cost terminal, and because it is difficult to frequently exchange a battery of the terminal, a very long battery life time such as 10 to 15 years may be required.

Finally, URLLC is a cellular based wireless communication service used for mission-critical. For example, a service used for remote control of a robot or machinery, industrial automation, unmanned aerial vehicle, remote health care, emergency alert, and the like may be considered. Therefore, communication provided by URLLC should provide very low latency and very high reliability. For example, a service supporting URLLC should satisfy air interface latency smaller than 0.5 milliseconds and simultaneously has the requirement of a packet error rate of 10-5 or less. Therefore, for a service supporting URLLC, the 5G system should provide a transmit time interval (TTI) smaller than that of other services, and may require a design requirement that should allocate a wide resource in a frequency band in order to simultaneously secure reliability of a communication link.

Three services, i.e., eMBB, URLLC, and mMTC of the 5G communication system may be multiplexed and transmitted in a single system. In this case, in order to satisfy different requirements of each service, different transmission and reception techniques and transmission and reception parameters may be used between services. The 5G system is not limited to the above-described three services.

Hereinafter, a frame structure of a 5G system will be described in more detail with reference to the drawings.

FIG. 1 is a diagram illustrating a basic structure of a time-frequency domain, which is a radio resource domain in which data or a control channel is transmitted in a 5G system.

In FIG. 1, a horizontal axis represents a time domain, and a vertical axis represents a frequency domain. A basic unit of a resource in the time and frequency domains is a resource element (RE) 101, and may be defined to one orthogonal frequency division multiplexing (OFDM) symbol 102 in a time axis and one subcarrier 103 in a frequency axis. In the frequency domain, the $N_{SC}^{RB}$ (e.g., 12) number of consecutive REs may constitute one resource block (RB) 104.

Figure 2:
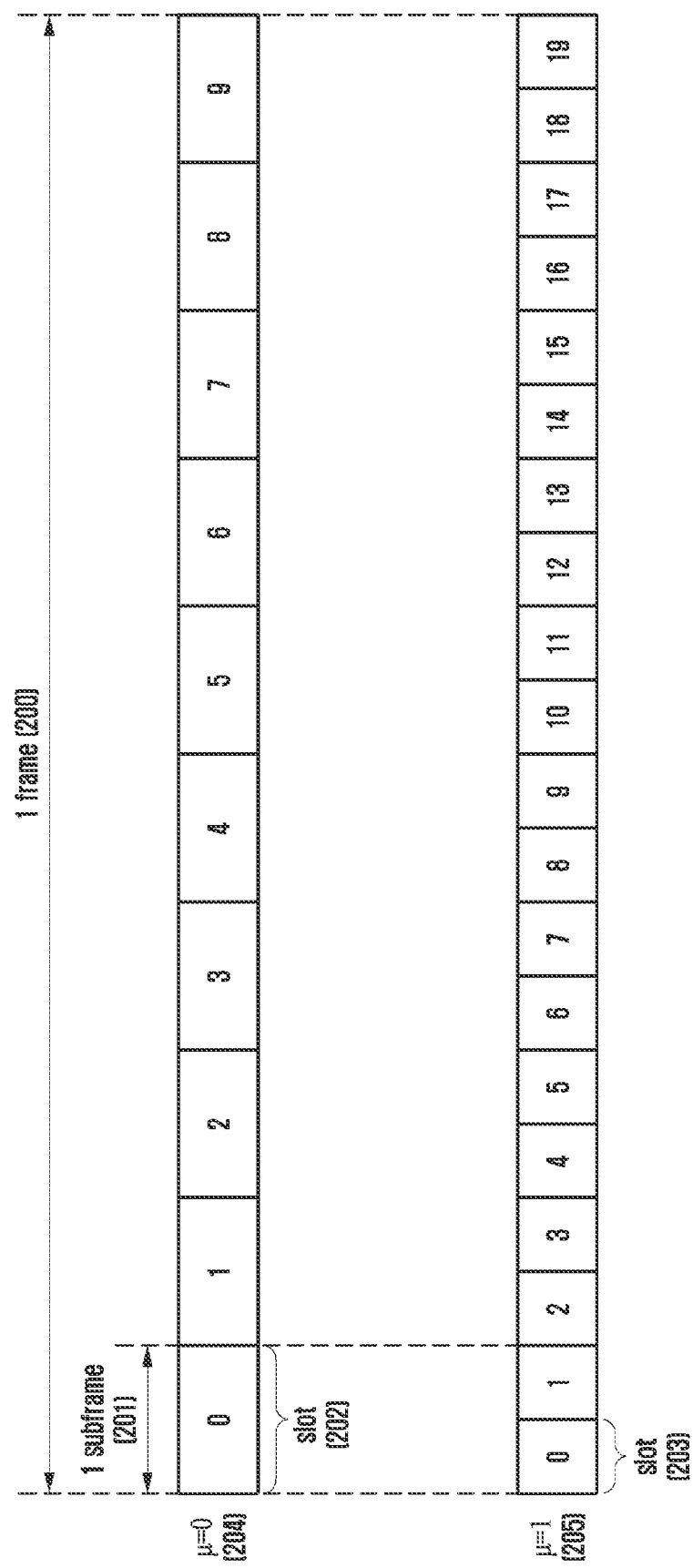
FIG. 2 is a diagram illustrating a frame, subframe, and slot structure in a 5G system.

FIG. 2 is a diagram illustrating a slot structure considered in a 5G system.

FIG. 2 illustrates an example of a structure of a frame 200, a subframe 201, and a slot 202, One frame 200 may be defined as 10 ms. One subframe 201 may be defined as 1 ms; thus, one frame 200 may be configured with total 10 subframes 201. One slots 202 and 203 may be defined as 14 OFDM symbols (i.e., the number $N_{symb}^{slot}$ of symbols per slot is 14). One subframe 201 may be configured with one or a plurality of slots 202 and 203, and the number of slots 202 and 203 per subframe 201 may be different according to μ (204, 205), which is a configuration value for subcarrier spacing. An example of FIG. 2 irk strafes a case of μ=0 (204) and μ=1 (205) as a subcarrier spacing configuration value. When μ=0 (204), one subframe 201 may be configured with one slot 202, and when μ=1 (205), one subframe 201 may be configured with two slots 203. That is, the number $N_{slot}^{subframe,\mu}$ of slots per subframe may vary according to the configuration value μ for the subcarrier spacing; thus, the number $N_{slot}^{frame,\mu}$ of slots per frame may vary. $N_{slot}^{subframe,\mu}$ and $N_{slot}^{frame,\mu}$ according to each subcarrier spacing configuration μ may be defined in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Hereinafter, a bandwidth part (MVP) configuration in a 5G communication system will be described.

Figure 3:
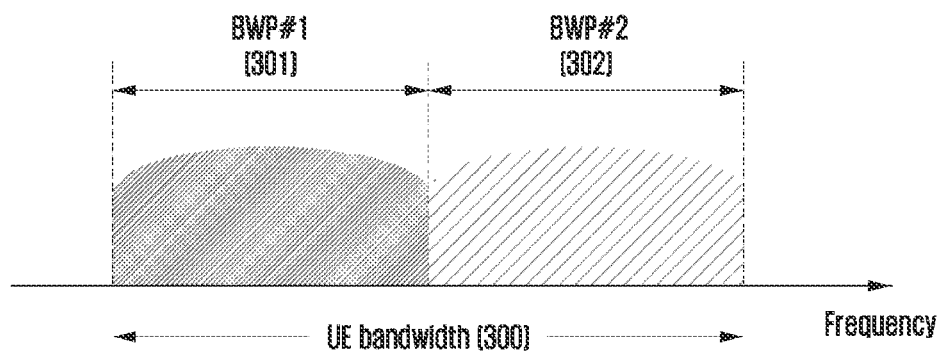
FIG. 3 is a diagram illustrating an example of configuring a bandwidth part in a 5G system.

FIG. 3 is a diagram illustrating an example of a configuration of a bandwidth part in a 5G system. FIG. 3 illustrates an example in which an UE bandwidth 300 is configured with two bandwidth parts, that is, a bandwidth part #1 (BWP #1) 301 and a bandwidth part #2 (BWP #2) 302. The base station may configure one or a plurality of bandwidth parts to the UE, and configure the following information for each bandwidth part.

TABLE 2

| BWP ::= | SEQUENCE { |
|---|---|
| bwp-Id (bandwidth part identifier) | |
| locationAndBandwidth (bandwidth part location) | INTEGER (1..65536), |
| subcarrierSpacing (subcarrier spacing) | ENUMERATED {n0, n1, n2, n3, n4, n5}, |
| cyclicPrefix (circular transposition) | ENUMERATED { extended } |
| } | |

The disclosure is not limited to the example, and in addition to the configuration information, various parameters related to a bandwidth part may be configured to the UE. The information may be transmitted by the base station to the UE through higher layer signaling, for example, radio resource control (RRC) signaling. At least one bandwidth part among one or a plurality of configured bandwidth parts may be activated. Whether the configured bandwidth part is activated may be semi-statically transmitted from the base station to the UE through RRC signaling or may be dynamically transmitted through downlink control information (DCI).

According to some embodiments, the UE before the RRC connection may receive an initial bandwidth part (initial BWP) for initial access from the base station through a master information block (MIB). More specifically, in an initial access step, the UE may receive configuration information on a search space and a control resource set (CORESET) in which a physical downlink control channel (PDCCH) for receiving system information (which may correspond to remaining system information (RMSI) or system information block 1 (SIB1)) required for initial access may be transmitted through the MIB. The CORESET and the search space configured by the MIB may be each regarded as an identifier (ID) 0. The base station may notify the UE of configuration information such as frequency allocation information, time allocation information, and numerology on a CORESET #0 through the MIB. Further, the base station may notify the UE of configuration information on a monitoring cycle and occasion on the CORESET #0, that is, configuration information on the search space #0 through the MIB. The UE may regard a frequency domain configured to the CORESET #0 obtained from the MIB as an initial bandwidth part for initial access. In this case, an identifier (ID) of the initial bandwidth part may be regarded as 0. The initial bandwidth part may be used for other system information (OSI), paging, and random access in addition to the purpose of receiving the SIB.

A configuration of the bandwidth part supported by the 5G system may be used for various purposes. When one or more bandwidth parts are configured to the UE, the base station may indicate the UE to change the bandwidth part using a bandwidth part indicator field in DCI. For example, in FIG. 3, when the currently activated bandwidth part of the UE is a BWP #1, 301, the base station may indicate a BWP #2, 302 to the UE with a bandwidth part indicator in DCI, and the UE may change the bandwidth part with the BWP #2, 302 indicated by the bandwidth part indicator in the received DCI.

As described above, because a change in the DCI-based bandwidth part may be indicated by DCI scheduling the PDSCH or the PUSCH, when the UE receives a request for changing the bandwidth part, the UE should be able to transmit and receive the PDSCH or PUSCH scheduled by the corresponding DCI without unreasonableness in the changed bandwidth part. To this end, the standard stipulates requirements for a delay time TBWP required when changing a bandwidth part, and may be defined, for example, as follows.

TABLE 3

| $\mu$ | NR slot length (ms) | BWP switch delay $T_{BWP}$ (slots) | |
|---|---|---|---|
| | | Type 1 (note 1) | Type 2 (note 2) |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirement for the bandwidth part change delay time supports a type 1 or a type 2 according to a capability of the UE. The UE may report a supportable bandwidth part delay time type to the base station.

According to the above-mentioned requirement for the bandwidth part change delay time, when the UE receives DCI including a bandwidth part change indicator in a slot n, the UE may complete the change to a new bandwidth part indicated by the bandwidth part change indicator at a time point not later than a slot $n+T_{BWP}$, and perform transmission and reception for the data channel scheduled by the corresponding DCI in the new changed bandwidth part. When the base station intends to schedule a data channel with a new bandwidth part, the base station may determine time domain resource allocation for the data channel in consideration of the bandwidth part change delay time $T_{BWP}$ of the UE. That is, upon scheduling a data channel with a new bandwidth part, the base station may schedule the corresponding data channel after the bandwidth part change delay time when determining time domain resource allocation for the data channel. Accordingly, the UE may not expect that the DCI indicating the bandwidth part change indicates a slot offset (K0 or K2) value smaller than the bandwidth part change delay time $T_{BWP}$.

When the UE receives DCI (e.g., DCI format 1_1 or 0_1) indicating the bandwidth part change, the UE may not perform any transmission or reception during a corresponding time period from a third symbol of a slot, having received a PDCCH including the DCI to a start point of a slot indicated by a slot offset (K0 or K2) value indicated by a time domain resource allocation indicator field in the DCI. For example, when the UE has received DCI indicating a bandwidth part change in a slot n, and the slot offset value indicated by the DCI is K, the UE may not perform any transmission or reception from a third symbol of the slot n to a symbol before a slot n+K (i.e., a last symbol of a slot n+K−1).

Hereinafter, a synchronization signal (SS)/PBCH block in the 5G system will be described. The SS/PBCH block may mean a physical layer channel block configured with a primary SS (PSS), a secondary SS (SSS), and a PBCH.—
PSS: It is a signal that serves as a reference for downlink tine/frequency synchronization and provides some information on a cell ID.
SSS: It serves as a reference for downlink time/frequency synchronization, and provides remaining cell ID information not provided by the PSS. Additionally, the SSS may serve as a reference signal for demodulation of the PBCH.
PBCH: It provides essential system information necessary for transmitting and receiving data channel and control channel of the UE. The essential system information may include search space-related control information indicating radio resource mapping information of a control channel, scheduling control information on a separate data channel for transmitting system information, and the like.
SS/PBCH block: The SS/PBCH block is configured with a combination of a PSS, SSS, and a PBCH. One or a plurality of SS/PBCH blocks may be transmitted within 5 ms, and each transmitted SS/PBCH block may be distinguished by an index.

The UE may detect a PSS and a SSS in an initial access step and decode a PBCH. The UE may obtain an MIB from the PBCH and receive a configuration of a CORESET #0 therefrom. The UE may perform monitoring on the CORESET #0, assuming that the selected SS/PBCH block and a demodulation reference signal (DMRS) transmitted in the CORESET #0 are quasi co location (QCL). The UE may receive system information as downlink control information transmitted in the CORESET #0. The UE may obtain a random access channel (RACH) related configuration information required for initial access from the received system information. The UE may transmit a physical RACH (PRACH) to the base station in consideration of the selected SS/PBCH index, and the base station, having received the PRACH may obtain information on an SS/PBCH block index selected by the UE. The base station may know the fact that the UE has selected a certain block from each of the SS/PBCH blocks and monitors the CORESET #0 related thereto. Hereinafter, downlink control information (DCI) in the 5G system will be described in detail.

In the 5G system, scheduling information on uplink data (or physical uplink shared channel (PUSCH)) or downlink data (or physical downlink shared channel (PDSCH)) is transmitted from the base station to the UE through DCI. The UE may monitor a DCI format for fallback and a DCI format for non-fallback for the PUSCH or the PDSCH. The DCI format for fallback may be configured with a predefined fixed field between the base station and the UE, and the DCI format for non-fallback may include a configurable field. DCI may be transmitted through a PDCCH, which is a physical downlink control channel through channel coding and modulation processes. A cyclic redundancy check (CRC) is attached to a DCI message payload, and the CRC may be scrambled with a radio network temporary identifier (RNTI) corresponding to the identity of the UE. Different RNTIs may be used according to the purpose of the DCI message, for example, UE-specific data transmission, a power control command, or a random access response. That is, the RNTI is not explicitly transmitted, but is transmitted while being included in a CRC calculation process. Upon receiving the DCI message transmitted on the PDSCH, the UE may identify the CRC using the allocated RNTI, and when the CRC identify result is correct, the UE may know that the message has been transmitted to the UE.

For example, DCI scheduling a PDSCH for system information (SI) may be scrambled with an SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying transmit power control (TPC) may be scrambled with a TPC-RNTI. DCI for scheduling a UE-specific PDSCH or PUSCH may be scrambled with a cell RNTI (C-RNTI).

A DCI format 0_0 may be used as fallback DCI for scheduling a PUSCH, and in this case, a CRC may be scrambled with a C-RNTI. A DCI format 0_0 in which a CRC is scrambled with a C-RNTI may include, for example, the following information.

TABLE 4

Identifier for DCI formats - [1] bit
    Frequency domain resource assignment - [ $\lceil \log_2(N_{RB}^{UL,BWP}(N_{RB}^{UL,BWP} + 1)/2) \rceil$ ] bits
    Time domain resource assignment - 4 bits
    Frequency hopping flag - 1 bit
    Modulation and coding scheme - 5 bits
    New data indicator - 1 bit
    Redundancy version - 2 bits
    HARQ process number - 4 bits
    Transmit power control (TPC) command for scheduled PUSCH - [2] bits
    Uplink/supplementary uplink indicator (UL/SUL indicator) - 0 or 1 bit A DCI format 0_1 may be used as non-fallback DCI for scheduling a PUSCH, and in this case, a CRC may be scrambled with a C-RNTI. In an embodiment, a DCI format 0_1 in which a CRC is scrambled with a C-RNTI may include the following information.

TABLE 5

- Carrier indicator - 0 or 3 bits
- UL/SUL indicator - 0 or 1 bit
-    Identifier for DCI formats - [1] bits
- Bandwidth part indicator - 0, 1 or 2 bits
- Frequency domain resource assignment
  ○ For resource allocation type 0, $\lceil N_{RB}^{DL,\,BWP}/P \rceil$ bits
  ○ For resource allocation type 1, $\lceil \log_2(N_{RB}^{UL,\,BWP}(N_{RB}^{UL,\,BWP} + 1)/2) \rceil$ bits
- Time domain resource assignment - 1, 2, 3, or 4 bits
- Virtual resource block-to-physical resource block mapping (VRB-to-PRB mapping) - 0 or 1 bit, only for resource allocation type 1.
  ○ 0 bit if only resource allocation type 0 is configured;
  ○ 1 bit otherwise.
- Frequency hopping flag - 0 or 1 bit, only for resource allocation type 1.
  ○ 0 bit if only resource allocation type 0 is configured;
  ○ 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  ○ 1 bit for semi-static HARQ-ACK codebook;
  ○ 2 bits for dynamic HARQ-ACK codebook with single HARQ-ACK codebook.
- 2nd downlink assignment index - 0 or 2 bits
  ○ 2 bits for dynamic HARQ-ACK codebook with two HARQ-ACK sub-codebooks;
  ○ 0 bit otherwise.
- TPC command for scheduled PUSCH - 2 bits
- SRS resource indicator -

$$\left\lceil \log_2\left(\sum_{k=1}^{L_{max}} \binom{N_{SRS}}{k}\right)\right\rceil \text{ or } \lceil \log_2(N_{SRS}) \rceil \text{ bits}$$

○ bits for non-codebook based PUSCH transmission;
  ○ bits for codebook based PUSCH transmission.
- Precoding information and number of layers - up to 6 bits
- Antenna ports - up to 5 bits
- SRS request - 2 bits
- Channel state information request (CSI request) - 0, 1, 2, 3, 4, 5, or 6 bits
- Code block group transmission information (CBG transmission information) 0, 2, 4, 6 or 8 bits
- Phase tracking reference signal-demodulation reference signal association (PTRS-DMRS association) - 0 or 2 bits.
- beta_offset indicator - 0 or 2 bits
- DMRS sequence initialization - 0 or 1 bit A DCI format 1_0 may be used as fallback DCI for scheduling a PDSCH, and in this case, a CRC may be scrambled with a C-RNTI. In an embodiment, the DCI format 1_0 in which a CRC is scrambled with a C-RNTI may include the following information.

TABLE 6

Identifier for DCI formats - [1] bit
Frequency domain resource assignment -[ $\lceil \log_2(N_{RB}^{dL,BWP}(N_{RB}^{dL,BWP} + 1)/2) \rceil$ ] bits
Time domain resource assignment - 4 bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits A DCI format 1_1 may be used as non-fallback DCI for scheduling a PDSCH, and in this case, a CRC may be scrambled with a C-RNTI. In an embodiment, the DCI format 1_1 in which a CRC is scrambled with a C-RNTI may include the following information.

TABLE 7

Carrier indicator - 0 or 3 bits
   Identifier for DCI formats - [1] bits
   Bandwidth part indicator - 0, 1 or 2 bits
   Frequency domain resource assignment
   For resource allocation type 0, $\lceil N_{RB}^{DL,BWP}/P \rceil$ bits
   For resource allocation type 1, $\lceil \log_2(N_{RB}^{DL,BWP}(N_{RB}^{DL,BWP} + 1)/2) \rceil$ bits
   Time domain resource assignment -1, 2, 3 or 4 bits
   VRB-to-PRB mapping - 0 or 1 bit, only for resource allocation type 1.
   0 bit if only resource allocation type 0 is configured;
   1 bit otherwise.
PRB bundling size indicator - 0 or 1 bit
Rate matching indicator - 0, 1, or 2 bits
Zero power channel state information reference signal trigger (ZP CSI-RS trigger) - 0, 1, or 2 bits
For transport block 1:
   Modulation and coding scheme - 5 bits
   New data indicator - 1 bit
   Redundancy version - 2 bits
For transport block 2:
   Modulation and coding scheme - 5 bits
   New data indicator - 1 bit
   Redundancy version - 2 bits
   HARQ process number - 4 bits
   Downlink assignment index - 0 or 2 or 4 bits
   TPC command for scheduled PUCCH - 2 bits
   PUCCH resource indicator - 3 bits
PDSCH-to-HARQ_feedback timing indicator - 3 bits
   Antenna ports - 4, 5 or 6 bits
Transmission configuration indication (TCI)- 0 or 3 bits
   SRS request - 2 bits
CBG transmission information - 0, 2, 4, 6, or 8 bits
Code block group flushing out information (CBG flushing out information) - 0 or 1 bit
   DMRS sequence initialization - 1 bit Hereinafter, a method of allocating time domain resources for a data channel in a 5G communication system will be described.

The base station may configure a table for time domain resource allocation information for a downlink data channel and an uplink data channel to the UE through higher layer signaling (e.g., RRC signaling). The base station may configure a table consisting of maxNrofDL-Allocations=16 entries for a PDSCH, and configure a table consisting of maxNrofUL-Allocations=16 entries for a PUSCH. The time domain resource allocation information may include, for example, the PDCCH-to-PDSCH slot timing (corresponding to a time interval in units of a slot between a time point at which a PDCCH is received and a time point at which a PDSCH scheduled by the received PDCCH is transmitted, denoted by K0) or PDCCH-to-PUSCH slot timing (corresponding to a time interval in units of a slot between a time point at which a PDCCH is received and a time point at which a PUSCH scheduled by the received PDCCH is transmitted, denoted by K2), information on a position and length of a start symbol in which the PDSCH or PUSCH is scheduled in the slot, a mapping type of the PDSCH or the PUSCH, and the like. For example, information such as Table 8 may be notified from the base station to the UE.

TABLE 8

PDSCH-TimeDomainResourceAllocationList information element
PDSCH-TimeDomainResourceAllocationList ::=      SEQUENCE (SIZE(1..maxNrofDL-
Allocations)) OF PDSCH-TimeDomainResourceAllocation
PDSCH-TimeDomainResourceAllocation ::=          SEQUENCE {
  k0                                            INTEGER(0..32)
OPTIONAL,   -- Need S
(PDCCH-to-PDSCH timing, slot unit)
mappingType                                     ENUMERATED {typeA, typeB},
(PDSCH mapping type)
startSymbolAndLength                            INTEGER (0..127)
(Start symbol and length of PDSCH)

TABLE 9

PUSCH-TimeDomainResourceAllocation information element
PUSCH-TimeDomainResourceAllocationList ::=      SEQUENCE
(SIZE(1..maxNrofUL-Allocations)) OF PUSCH-TimeDomainResourceAllocation
PUSCH-TimeDomainResourceAllocation ::=          SEQUENCE {
  k2                                            INTEGER (0..32)
OPTIONAL,   -- Need S
(PDCCH-to-PUSCH timing, slot unit)
mappingType                                     ENUMERATED {typeA, typeB},
(PUSCH mapping type)
startSymbolAndLength                            INTEGER (0..127)
(Start symbol and length of PUSCH)
}

The base station may notify the UE of one of entries in a table for the time domain resource allocation information through L1 signaling (e.g., DCI) (e.g., may be indicated by a 'time domain resource allocation' field in DCC). The UE may obtain time domain resource allocation information on the PDSCH or PUSCH based on the DCI received from the base station.

Figure 4:
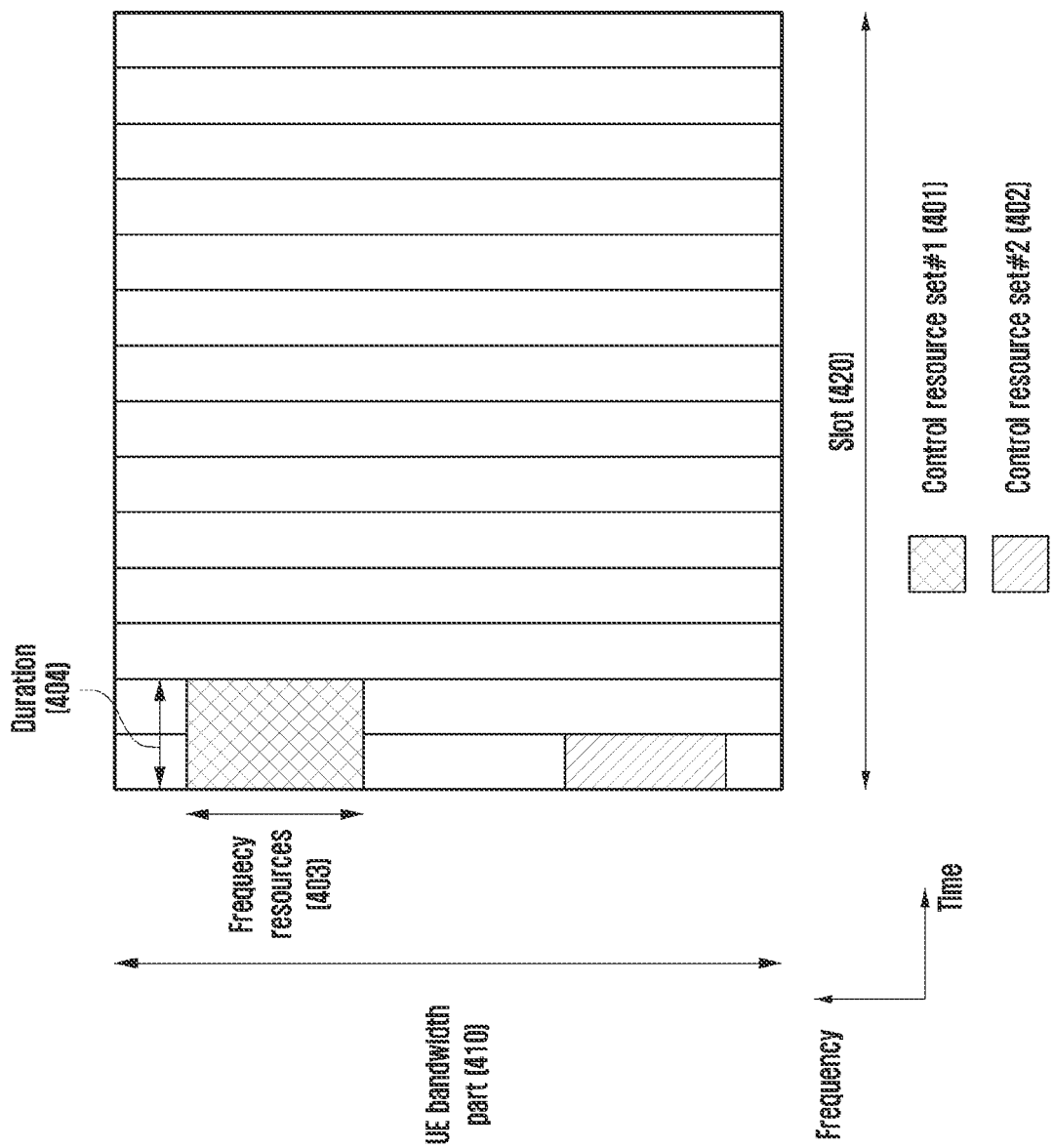
FIG. 4 is a diagram illustrating an example of configuring a control resource set of a downlink control channel in a 5G system.

Hereinafter, a downlink control channel in a 5G communication system will be described. FIG. 4 is a diagram illustrating an example of a CORESET in which a downlink control channel is transmitted in a 5G wireless communication system. FIG. 4 illustrates an example in which a UE bandwidth part 410 is configured in the frequency axis and two CORESETs (CORESET #1, 401, CORESET #2, 402) are configured in one slot 420 on the time axis. The CORESETs 401 and 402 may be configured to a specific frequency resource 403 within the entire UE bandwidth part 410 in the frequency axis. In a time axis, one or a plurality of OFDM symbols may be configured, and this may be defined as CORESET duration 404. With reference to the example illustrated in FIG. 4, the CORESET #1, 401 is configured to CORESET duration of 2 symbols, and the CORESET #2, 402 is configured to CORESET duration of 1 symbol.

The CORESET in the above-described 5G system may be configured by the base station to the UE through higher layer signaling (e.g., system information, master information block (MIB), and radio resource control (RRC) signaling). Configuring the CORESET to the UE means providing information such as a CORESET identifier, a frequency position of the CORESET, and a symbol length of the CORESET. For example, the CORESET configuration information may include the following information.

TABLE 10

| | |
|---|---|
| ControlResourceSet ::= | SEQUENCE { |
| -- Corresponds to L1 parameter 'CORESET-ID' | |
| controlResourceSetId | ControlResourceSetId, |
| (CORESET identifier) | |
| frequencyDomainResources | BIT STRING (SIZE (45)), |
| (Frequency axis resource allocation information) | |
| duration | INTEGER |
| (1..maxCoReSetDuration), | |
| (Time axis resource allocation information) | |
| cce-REG-MappingType | CHOICE { |
| (CCE-to-REG mapping method) | |
| interleaved | SEQUENCE { |
| reg-BundleSize | |
| ENUMERATED {n2, n3, n6}, | |
| (REG bundle size) | |
| precoderGranularity | ENUMERATED |
| {sameAsREG-bundle, allContiguousRBs}, | |
| interleaverSize | |
| ENUMERATED {n2, n3, n6} | |

TABLE 10-continued

```
(Interleaver size)
shiftIndex
    INTEGER(0..maxNrofPhysicalResourceBlocks-1)
        OPTIONAL
(Interleaver shift)
},
    nonInterleaved                              NULL
},
    tci-StatesPDCCH
    SEQUENCE(SIZE (1..maxNrofTCI-StatesPDCCH)) OF TCI-StateId
        OPTIONAL,
(QCL configuration information)
tci-PresentInDCI                                ENUMERATED {enabled}
    OPTIONAL,  -- Need S
}
```

In Table 10, tci-StatesPDCCH (simply referred to as Transmission Configuration Indication (TCI) state) configuration information may include information on one or a plurality of synchronization signals (SS)/physical broadcast channel (PBCH) block index or a channel state information reference signal (CSI-RS) index in a Quasi Co Located (QCL) relationship with a DMRS transmitted in a corresponding CORESET.

Figure 5:
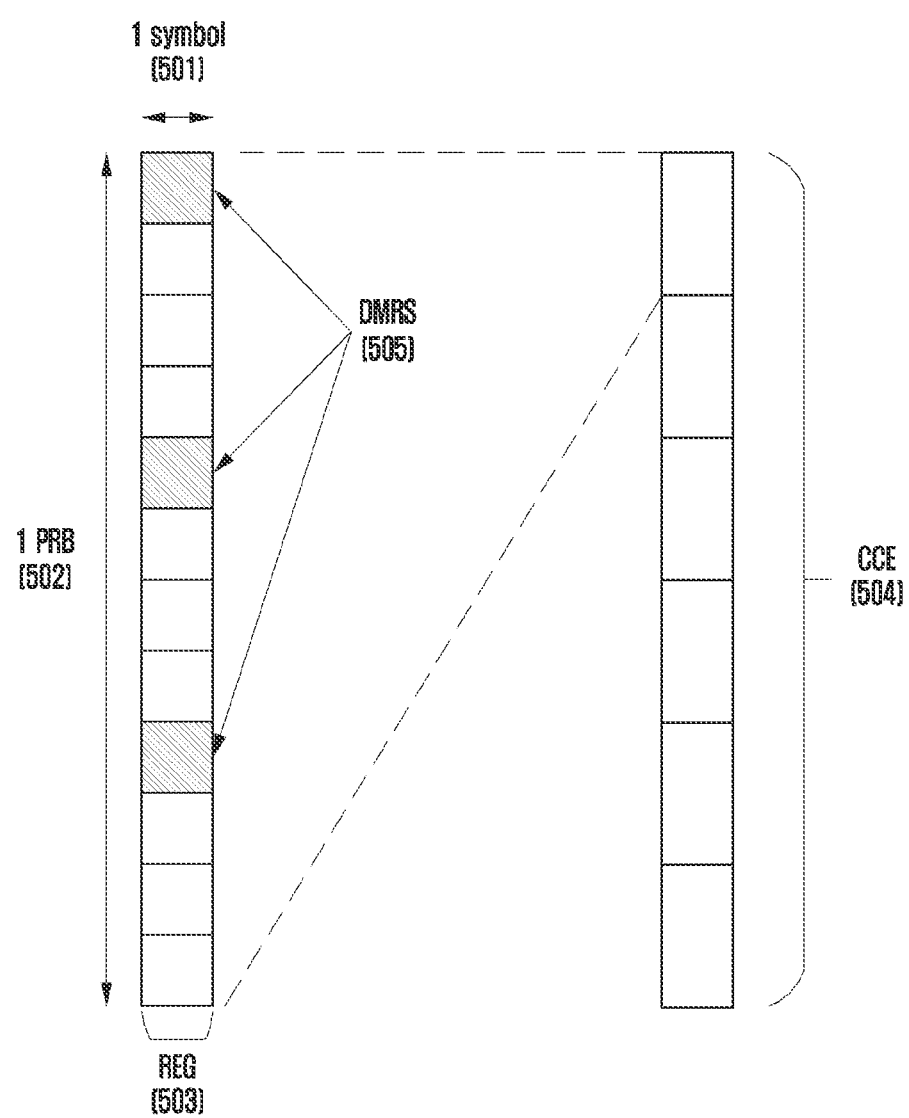
FIG. 5 is a diagram illustrating a structure of a downlink control channel in a 5G system.

FIG. 5 is a diagram illustrating an example of a basic unit of time and frequency resources constituting a downlink control channel that may be used in a 5G system. With reference to FIG. 5, a basic unit of time and frequency resources constituting a control channel may be referred to as a resource element group (REG) 503, and the REG 503 may be defined to 1 OFDM symbol 501 in the time axis and 1 physical resource block (PRB) 502 on the frequency axis, that is, 12 subcarriers. The base station may configure a downlink control channel allocation unit by concatenating the REG 503.

As illustrated in FIG. 5, when a basic unit to which a downlink control channel is allocated in a 5G system is a control channel element (CCE) 504, one CCE 504 may be configured with a plurality of REGs 503. When the REG 503 illustrated in FIG. 5 is described as an example, the REG 503 may be configured with 12 REs, and when one CCE 504 is configured with 6 REGs 503, one CCE 504 may be configured with 72 REs. When a downlink CORESET is configured, the corresponding region may be configured with a plurality of CCEs 504, and a specific downlink control channel may be mapped and transmitted to one or a plurality of CCEs 504 according to an aggregation level (AL) in the CORESET. The CCEs 504 in the CORESET may be divided by numbers, and in this case, the numbers of the CCEs 504 may be assigned according to a logical mapping method. A basic unit, that is, the REG 503 of the downlink control channel illustrated in FIG. 5 may include both REs to which DCI is mapped and a region to which a DMRS 505, which is a reference signal for decoding the REs, is mapped. As illustrated in FIG. 5, three DMRSs 505 may be transmitted within one REG 503. The number of CCEs required for transmitting the PDCCH may be 1, 2, 4, 8, or 16 according to an aggregation level (AL), and the number of different CCEs may be used for implementing link adaptation of the downlink control channel. For example, when AL=L, one downlink control channel may be transmitted through the L number of CCEs. The UE should detect a signal without knowing information on the downlink control channel, and for blind decoding of the LE, a search space indicating a set of CCEs is defined. The search space is a set of downlink control channel candidates consisting of CCEs that the UE should attempt to decode on a given aggregation level, and because there are various aggregation levels that make one bundle with 1, 2, 4, 8, or 16 CCEs, the UE may have a plurality of search spaces. A search space set may be defined as a set of search spaces in all configured aggregation levels. The search space may be classified into a common search space and a UE-specific search space. In order to receive cell-common control information such as dynamic scheduling or paging message on system information, UEs of a certain group or all UEs may search for the common search space of the PDCCH. For example, PDSCH scheduling assignment information for transmission of an SIB including cell operator information, and the like may be received by searching for the common search space of the PDCCH, In the case of the common search space, because UEs of a certain group or all UEs should receive the PDCCH, the common search space may be defined as a set of pre-promised CCEs. Scheduling assignment information on the UE-specific PDSCH or PUSCH may be received by searching for the UE-specific search space of the PDCCH. The UE-specific search space may be UE-specifically defined as a function of the identity of the UE and various system parameters.

In the 5G system, a parameter for the search space for the PDCCH may be configured from the base station to the UE through higher layer signaling (e.g., SIB, MIB, RRC signaling). For example, the base station may configure the number of PDCCH candidates in each aggregation level L, a monitoring cycle for the search space, a monitoring occasion in a symbol unit in the slot for the search space, a search space type (common search space or UE-specific search), a combination of a DCI format and an RNTI to be monitored in the corresponding search space, and a CORESET index for monitoring the search space to the UE. For example, the following information may be included.

TABLE 11

```
SearchSpace ::= SEQUENCE {
    -- Identity of the search space. SearchSpaceId = 0 identifies the SearchSpace
    configured via PBCH (MIB) or ServingCellConfigCommon.
        searchSpaceId SearchSpaceId,
(Search space identifier)
controlResourceSetId ControlResourceSetId,
(CORESET identifier)
monitoringSlotPeriodicityAndOffset    CHOICE {
(Monitoring slot level cycle)
sl1 NULL,
sl2 INTEGER (0..1),
sl4 INTEGER (0..3),
sl5 INTEGER (0..4),
sl8 INTEGER (0..7),
sl10 INTEGER (0..9),
sl16 INTEGER (0..15),
sl20 INTEGER (0..19)
}   OPTIONAL,
duration (monitoring length) INTEGER (2.2.2559)
monitoringSymbolsWithinSlot BIT STRING (SIZE (14)) OPTIONAL,
(Monitoring symbol in slot)
nrofCandidates SEQUENCE {
(Number of PDCCH candidates for each aggregation level)
aggregationLevel1ENUMERATED {n0, n1, n2, n3, n4, n5, n6, n8},
aggregationLevel2 ENUMERATED {n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8},
    },
searchSpaceType CHOICE {
(Search space type)
-- Configures this search space as common search space (CSS) and DCI formats to monitor.
Common SEQUENCE {
(Common search space)
}
ue-Specific SEQUENCE {
(UE-specific search space)
-- Indicates whether the UE monitors in this USS for DCI formats 0-0 and 1-0 or for formats
0-1 and 1-1.
formats ENUMERATED {formats0-0-And-1-0, formats0-1-And-1-1},
...
}
```

According to configuration information, the base station may configure one or a plurality of search space sets to the UE. According to some embodiments, the base station may configure a search space set 1 and a search space set 2 to the UE, configure to monitor a DCI format A scrambled with an X-RNTI in the search space set 1 in the common search space, and configure to monitor a DCI format B scrambled with a Y-RNTI in the search space set 2 in a UE-specific search space.

According to the configuration information, one or a plurality of search space sets may exist in the common search space or the UE-specific search space. For example, a search space set #1 and a search space set #2 may be configured as the common search space, and a search space set #3 and a search space set #4 may be configured as the UE-specific search space.

In the common search space, a combination of the following DCI format and RNTI may be monitored. The disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of the following DCI format and RNTI may be monitored. The disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTs may follow the definitions and uses below.

Cell RNTI (C-RNTI): Used for scheduling a UE-specific PDSCH

Temporary Cell RNTI (TC-RNTI): Used for scheduling a UE-specific PDSCH

Configured Scheduling RNTI (CS-RNTI): Used for scheduling a semi-statically configured UE-specific PDSCH Random Access RNTI (RA-RNTI): Used for scheduling a PDSCH in a random access step Paging RNTI (P-RNTI): Used for scheduling a PDSCH in which paging is transmitted System Information RNTI (SI-RNTI): Used for scheduling a PDSCH in which system information is transmitted Interruption RNTI (INT-RNTI): Used for notifying whether a PDSCH is punctured.

Transmit Power Control for PDSCH RNTI (TPC-PUSCH-RNTI): Used for indicating power control command for a PUSCH Transmit Power Control for PUCCH RNTI (TPC-PUCCH-RNTI): Used for indicating a power control command for a PUCCH Transmit Power Control for SRS RNTI (TPC-SRS-RNTI): Used for indicating a power control command for an SRS The above specified DCI formats may follow the definition below.

TABLE 12

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, the search space of the aggregation level L in the CORESET p and the search space set s may be represented as Equation 1.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

L: Aggregation level
$n_{CI}$: carrier index
$N_{CCE,p}$: the number of total CCEs existing in the CORESET p
$n_{s,f}^\mu$: slot index
$M_{p,s,max}^{(L)}$: the number of PDCCH candidates of the aggregation level L
$m_{s,n_{CI}} = 0, \ldots, M_{p,s,max}^{(L)} - 1$: PDCCH candidate index of the aggregation level L
$i = 0, \ldots, L-1$
$Y_{p,n_{s,f}^\mu} = (A_p \cdot Y_{p,n_{s,f}^\mu}) \bmod D$, $Y_{p,-1} = n_{RNTI} \neq 0$, $A_0 = 39827$, $A_1 = 39829$, $A_2 = 39839$, $D = 65537$
$n_{RNTI}$: UE identifier The value $Y_{p,n_{s,f}^\mu}$ may correspond to 0 in the case of a common search space.

In the case of a UE-specific search space, the value $Y_{p,n_{s,f}^\mu}$ may correspond to a value that changes according to the identity (C-RNTI or ID configured to the UE by the base station) of the UE and the time index.

In the 5G system, as a plurality of search space sets may be configured with different parameters (e.g., parameters of Table 11), the set of search space sets monitored by the UE at every time point may vary. For example, when the search space set #1 is configured as an X-slot cycle, the search space set #2 is configured as a Y-slot cycle and when X and Y are different, the UE may monitor both the search space set #1 and the search space set #2 in a specific slot, and monitor one of the search space set #1 and the search space set #2 in a specific slot.

When a plurality of search space sets are configured to the UE, the following conditions may be considered in a method for determining the search space set to be monitored by the UE.

[Condition 1: Limit the number of maximum PDCCH candidates]

The number of PDCCH candidates that may be monitored per slot does not exceed $M^\mu$. $M^\mu$ may be defined as the number of maximum PDCCH candidates per slot in a cell configured to subcarrier spacing of $15 \cdot 2^\mu$ kHz, and be defined in Table 13.

TABLE 13

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limit the Number of Maximum CCEs]

The number of CCEs constituting the entire search space per slot (where the entire search space means the entire CCE sets corresponding to a union region of a plurality of search space sets) does not exceed $C^\mu$. $C^\mu$ may be defined as the number of maximum CCEs per slot in a cell configured to subcarrier spacing of $15 \cdot 2^\mu$ kHz, and be defined in Table 14.

TABLE 14

| μ | Maximum number of PDCCH candidates per slot and per serving cell (Cμ) |
|---|---|
| 0 | 56 |
| 1 | 56 |
| 2 | 48 |
| 3 | 32 |

For convenience of description, a situation in which both conditions 1 and 2 are satisfied at a specific time point is defined as a condition A. Accordingly, not satisfying the condition A may mean not satisfying at least one of the above conditions 1 and 2.

According to a configuration of search space sets of the base station, the condition A may not be satisfied at a specific time point. When the condition A is not satisfied at a specific time point, the UE may select and monitor only some of the search space sets configured to satisfy the condition A at the corresponding time point, and the base station may transmit the PDCCH in the selected search space set.

The following method may be followed as a method of selecting some search spaces among the entire configured search space sets. When the condition A for the PDCCH is not satisfied at a specific time point (slot), the UE (or the base station) may preferentially select a search space set in which the search space type is configured as a common search space among the search space sets existing at the corresponding time point over the search space set configured as the UE-specific search space. When all search space sets configured as the common search space are selected (i.e., when a condition A is satisfied even after selecting all search spaces configured as the common search space), the UE (or the base station) may select search space sets configured as the UE-specific search space. In this case, when there are a plurality of search space sets configured as the UE-specific search space, a search space set having a low search space set index may have a higher priority. In consideration of a priority, UE-specific search space sets may be selected within a range in which the condition A is satisfied.

Figure 6:
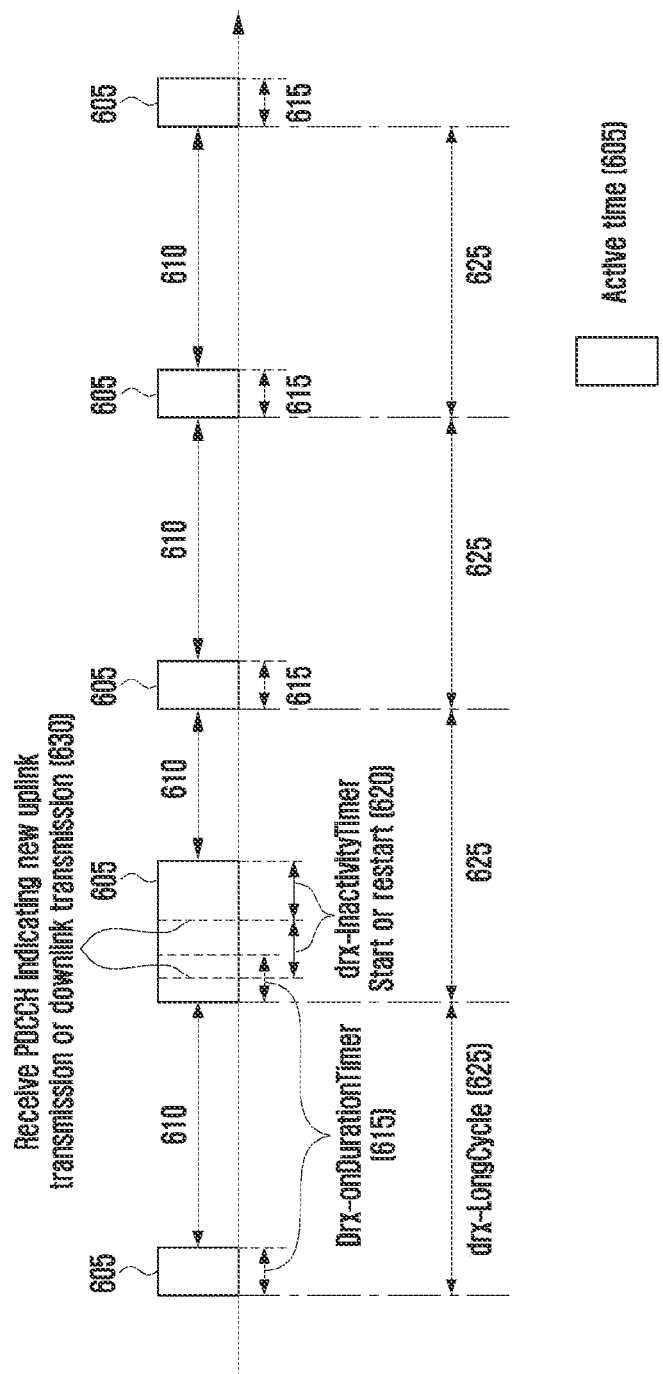
FIG. 6 is a diagram illustrating an example of a DRX operation in a 5G system.

FIG. 6 is a diagram illustrating discontinuous reception (DRX).

DRX is an operation in which a UE using a service discontinuously receives data in an RRC connected state in which a radio link is established between a base station and the UE. When DRX is applied, the UE may turn on a receiver at a specific time point to monitor a control channel, and when there is no data received for a certain time cycle, the UE may turn off the receiver to reduce power consumption thereof. A DRX operation may be controlled by an MAC layer device based on various parameters and timers.

With reference to FIG. 6, an active time 605 is a time in which the UE wakes up every DRX cycle to monitor a PDCCH. The active time 605 may be defined as follows.

When a drx-onDurationTimer, drx-InactivityTimer, drx-RetransmissionTimerDL, drx-RetransmissionTimerUL, or ra-ContentionResolutionTimer is running; or When the scheduling request is transmitted on a PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble The drx-onDurationTimer, drx-InactivityTimer, drx-RetransmissionTimerDL, drx-RetransmissionTimerUL, ra-ContentionResolutionTimer, and the like are timers whose values are configured by the base station and have a function of configuring the UE to monitor the PDCCH in a situation where a predetermined condition is satisfied.

A drx-onDurationTimer 615 is a parameter for configuring the minimum time that the UE is awake in the DRX cycle. A drx-InactivityTimer 620 is a parameter for configuring an additional awake time of the UE when receiving a PDCCH indicating new uplink transmission or downlink transmission (630). The drx-RetransmissionTimerDL is a parameter for configuring the maximum time that the UE is awake in order to receive downlink retransmission in a downlink HARQ procedure. The drx-RetransmissionTimerUL is a parameter for configuring the maximum time that the UE is awake in order to receive an uplink retransmission grant in an uplink HARQ procedure. The drx-onDurationTimer, drx-InactivityTimer, dr-RetransmissionTimerDL and drx-RetransmissionTimerUL may be configured to, for example, a time, the number of subframes, the number of slots, and the like. The ra-ContentionResolutionTimer is a parameter for monitoring the PDCCH in a random access procedure.

An inactive time 610 is a time configured not to monitor a PDCCH or a time configured not to receive a PDCCH during a DRX operation, and the remaining time, except for the active time 605 from a total time for performing the DRX operation may be the inactive time 610. When the UE does not monitor the PDCCH during the active time 605, the UE may enter a sleep or inactive state to reduce power consumption.

The DRX cycle means a cycle in which the UE wakes up and monitors the PDCCH. That is, the DRX cycle means a time interval or an on-duration generation cycle until monitoring the next PDCCH after the UE monitors a PDCCH. There are two types of DRX cycle: short DRX cycle and long DRX cycle. The short DRX cycle may be optionally applied. A drx-LongCycle 625 is a long cycle of two DRX cycles configured to the UE. The UE starts again the drx-onDurationTimer 615 at a time point at which the drx-LongCycle 625 has elapsed from a start point (e.g., start symbol) of the drx-onDurationTimer 615 while operating in the drx-LongCycle. When operating with the drx-LongCycle 625, the UE may start the drx-onDurationTimer 615 in a slot after drx-SlotOffset in a subframe satisfying Equation 2. Here, drx-SlotOffset means delay before starting the drx-onDurationTimer 615. drx-SlotOffset may be configured to, for example, a time, the number of slots, and the like.

$$[(SFN \times 10)+\text{subframe number}] \bmod (\text{drx-LongCycle})=\text{drx-StartOffset} \quad \text{[Equation 2]}$$

In this case, drx-LongCycleStartOffset and drx-StartOffset may be used for defining a subframe that will start the drx-LongCycle 625. drx-LongCycleStartOffset may be configured to, for example, a time, the number of subframes, the number of slots, and the like.

Hereinafter, a carrier aggregation (CA) and scheduling method in a 5G communication system will be described in detail.

The UE may receive a configuration of a plurality of cells (cell or component carrier (CC)) from the base station. Further, the UE may receive a configuration on whether to perform cross-carrier scheduling for configured cells. If a specific cell (cell A, scheduled cell) is configured to apply cross-carrier scheduling, PDCCH monitoring for a cell A is not performed in the cell A, but may be performed in another cell (cell B, scheduling cell) indicated to perform cross-carrier scheduling. In this case, the scheduled cell (Cell A) and the scheduling cell (Cell B) may be configured to different numerology. Here, numerology may include subcarrier spacing, a cyclic prefix (CP), and the like. When the cell A and the cell B have different numerologies, if a PDCCH of the cell B schedules a PDSCH of the cell A, the following minimum scheduling offset may be additionally considered between the PDCCH and the PDSCH.

[Cross-Carrier Scheduling Method]

When subcarrier spacing $\mu_B$ of the cell B is smaller than subcarrier spacing $\mu_A$ of the cell A, the PDSCH may be scheduled from the corresponding next PDSCH slot after an X symbol from a last symbol of the PDCCH received from the cell B. Here, X may vary according to $\mu_B$, and it may be defined as X=4 symbols when $\mu_B$=15 kHz, as X=4 symbols when $\mu_B$=30 kHz, and as X=8 symbols when $\mu_B$=60 kHz.

If subcarrier spacing $\mu_B$ of the cell B is greater than the subcarrier spacing $\mu_A$ of the cell A, the PDSCH may be scheduled from the corresponding time point after an X symbol from a last symbol of the PDCCH received in the cell B. Here, X may vary according to $\mu_B$, and it may be defined as X=4 symbols when $\mu_B$=30 kHz, as X=8 symbols when $\mu_B$=60 kHz, and as X=12 symbols when $\mu_B$=120 kHz.

Hereinafter, embodiments of the disclosure will be described in detail with reference to the accompanying drawings. Hereinafter, an embodiment of the disclosure will be described using a 5G system as an example, but the embodiment of the disclosure may be applied to other communication systems having a similar technical background or channel type. For example, LTE or LTE-A mobile communication and mobile communication technology developed after 5G may be included in the embodiment of the disclosure. Accordingly, the embodiments of the disclosure may be applied to other communication systems through some modifications within a range that does not significantly depart from the scope of the disclosure as determination by those of ordinary skill in the art.

Further, in the description of the disclosure, when it is determined that a detailed description of a related function or configuration may unnecessarily obscure the subject matter of the disclosure, a detailed description thereof will be omitted. The terms described below are terms defined in consideration of functions in the disclosure, which may vary according to intentions or customs of users and operators. Therefore, the definition should be made based on the content throughout this specification.

Hereinafter, in describing the disclosure, higher layer signaling may be signaling corresponding to at least one or a combination of one or more of the following signaling.
  MIB (Master Information Block)
  System information block (SIB) or SIB X (X=1, 2, . . . )
  RRC (Radio Resource Control)
  MAC (Medium Access Control) CE (Control Element)

Further, L1 signaling may be signaling corresponding to at least one or a combination of one or more of the following physical layer channels or signaling methods using signaling.
  PDCCH (Physical Downlink Control Channel)
  DCI (Downlink Control information)
  UE-specific DCI
  Group common DCI
  Common DCI
  Scheduling DCI (e.g., DCI used for scheduling downlink or uplink data)
  Non-scheduling DCI DCI not for the purpose of scheduling downlink or uplink data)
  PUCCH (Physical Uplink Control Channel)
  UCI (Uplink Control Information)

First Embodiment

In the first embodiment, a method of allocating time domain resources for a data channel in a next generation mobile communication system (5G or NR system) will be described. According to an embodiment of the disclosure, the base station may notify the UE of one of entries in a table for time domain resource allocation information through L1 signaling (e.g., DCI) (e.g., ma be indicated to a 'time domain resource allocation' field in DCI). The UE may obtain time domain resource allocation information on the PDSCH or PUSCH based on the DCI received from the base station.

If an entry having a value of K0 or K2 (hereinafter, K0/K2) of 0 is indicated, this may mean that the PDCCH and the data channel are scheduled in the same slot. This is referred to as self-slot scheduling.

If an entry having a value of K0/K2 greater than 0 is indicated, this may mean that the PDCCH and the data channel are scheduled in different slots. This is referred to as cross-slot scheduling.

In a next generation mobile communication system (5G or NR system), cross-slot scheduling may be utilized for the purpose of reducing power consumption of the UE. When cross-slot scheduling is supported, the UE may operate in a sleep mode between a time point of receiving the PDCCH and a time point in which transmission and reception of a data channel occurs, thereby reducing power consumption. Further, when cross-slot scheduling is supported, the UE may use a long processing time for the PDCCH, thereby reducing power consumption by increasing an operation speed. Further, time domain scheduling information for the PDSCH may be finally obtained when decoding is completed after receiving the PDCCH. Therefore, during a time period for receiving and decoding the PDCCH, because the UE cannot know whether the PDSCH is scheduled, it may be necessary to perform buffering on OFDM symbols in which the PDSCH may be scheduled, which may greatly increase power consumption of the UE. When the UE may know time domain resource allocation information on the PDSCH before decoding the PDCCH, that is, when the UE may know in advance that cross-slot scheduling will be performed, the UE may minimize unnecessary buffering for the PDSCH, thereby reducing power consumption.

In order to reduce power consumption of the LTE, the base station may indicate a minimum value of K0/K2 to be used in scheduling for the data channel to the UE through higher layer signaling or L1 signaling. The UE may expect that scheduling will be always performed with a value of K0/K2 greater than or equal to the minimum value of K0/K2 received from the base station. For convenience of description, the minimum value for K0/K2 indicated by the base station to the UE may be referred to as minimum offset.

The UE may receive an indication of the minimum offset value from the base station through DCI (e.g., DCI format 1_1 or DCT format 0_1) that schedules the PDSCH or the PDSCH, or non-scheduling DCI (e.g., a new DCI format defined for the purpose of power reduction, a new RNTI defined for the purpose of power reduction, or DCI format 2_0 or DCT format 2_1, etc.). The UE may separately receive different values for the minimum offset value $K0_{min}$ for K0 and the minimum offset value $K2_{min}$ for K2 or may receive a single value as the minimum offset value $K_{min}$ for K0 and K2 from the base station. In the disclosure, it is assumed that one minimum offset value $K_{min}$ is indicated, but even when $K0_{min}$ and $K2_{min}$ are indicated separately, the contents of the disclosure may be equally applied.

According to an embodiment of the disclosure, the UE may expect that scheduling will be performed only with entries in which the K0/K2 value is greater than or equal to the indicated minimum offset among preconfigured time domain resource allocation table values based on the minimum offset received from the base station. For example, it is assumed that the base station configures the time domain resource allocation table for the following PDSCH to the UE.

TABLE 15

| Entry index | PDSCH mapping type | K0 (or $K_0$) | Starting symbol | Length |
| --- | --- | --- | --- | --- |
| 1 | Type A | 0 | 2 | 8 |
| 2 | Type A | 0 | 2 | 10 |
| 3 | Type A | 1 | 2 | 9 |
| 4 | Type A | 1 | 2 | 7 |
| 5 | Type A | 2 | 2 | 5 |
| 6 | Type B | 2 | 9 | 4 |
| 7 | Type B | 3 | 4 | 4 |
| 8 | Type B | 4 | 5 | 7 |
| 9 | Type B | 5 | 5 | 2 |
| 10 | Type B | 7 | 9 | 2 |
| 11 | Type B | 8 | 12 | 1 |
| 12 | Type A | 9 | 1 | 10 |
| 13 | Type A | 10 | 1 | 6 |
| 14 | Type A | 21 | 2 | 4 |
| 15 | Type B | 30 | 4 | 7 |
| 16 | Type B | 32 | 8 | 4 |

When the base station indicates 3 as the minimum offset value to the UE, the UE may expect not to be scheduled with entries having a K0 value less than 3, that is, entry indexes 1, 2, 3, 4, 5, and 6, and expect to be scheduled only with the remaining entries, that is, entry indexes 7, 8, . . . , and 16, except for the entry indexes 1, 2, 3, 4, 5, and 6. For convenience of description, the following terms are defined.
  Valid entry: An entry in which a K0/K2 value is greater than or equal to the received minimum offset among preconfigured time domain resource allocation table values, and that may be used for scheduling
  Invalid entry: An entry in which a K0/K2 value is greater than or equal to the received minimum offset among preconfigured time domain resource allocation table values and that cannot be used for scheduling The UE may receive a minimum offset value from the base station through DCI transmitted at a specific time point, and apply the received minimum offset value from a time point after a specific time point from a time point in which the minimum offset value is received. For example, the UE may receive an indication of the minimum offset value by DCI received through a PDCCH transmitted at a time point $T_0$ from the base station, and apply contents of a minimum offset value, which is newly obtained, from a time point $T_{app}$ after a certain time $T_{delay}$ has elapsed. In this case, $T_{app}$ may be represented as a function for $T_0$ and $T_{delay}$. When the UE receives DCI indicating the minimum offset value at a time point $T_0$ from the base station, the UE may not expect to apply the indicated minimum offset value before $T_{app}$. Here, the meaning of applying the minimum offset value may correspond to an operation of determining and applying entries of a time domain resource allocation table configured through higher layer signaling as valid or invalid entries based our the minimum offset value received by the UE.

Figure 7:
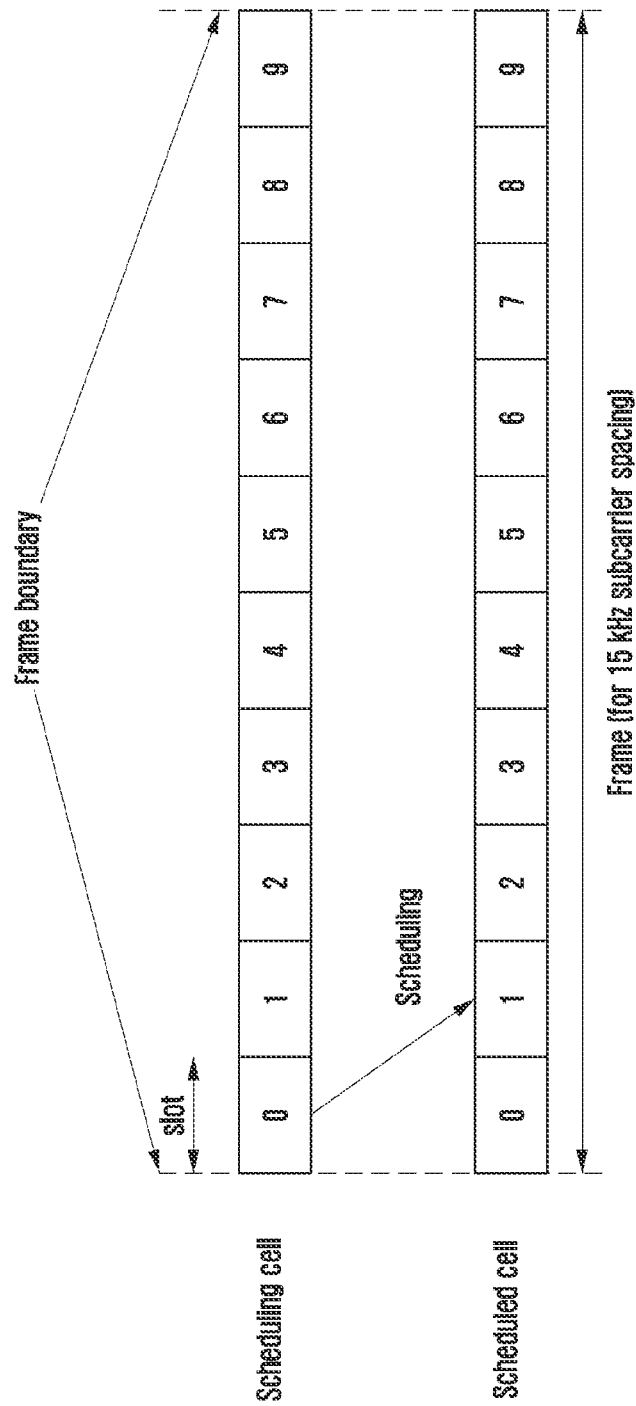
FIG. 7 is a diagram illustrating an example of a case in which frame boundaries match between a cell performing scheduling and a cell to which scheduling is applied.

When carrier aggregation is configured and a plurality of carriers are configured to the UE and a system is operated, a condition that frame boundaries between carriers or between serving cells match may be required. As described above, a frame is defined as 10 ms, and one frame may include a plurality of slots. FIG. 7 is a diagram illustrating an example of a case in which frame boundaries match between a cell performing scheduling and a cell to which scheduling is applied. For example, when subcarrier spacing of 15 kHz is used, the slot becomes 1 ms; thus, one frame may be configured with 10 slots, as illustrated in FIG. 7. In this case, FIG. 7 illustrates an example of a case in which frame boundaries match between a cell performing scheduling and a cell to which scheduling is applied.

In downlink data transmission, when control information (DCI) including scheduling information is transmitted in a slot n of a scheduling cell and K0, which is slot offset information between control information and data, is transmitted in the control information, data in the scheduled cell is transmitted in a slot $$\left\lfloor n \cdot \frac{2^{\mu_{PDSCH}}}{2^{\mu_{PDCCH}}} \right\rfloor + K_0.$$

In the above description, $\mu_{PDSCH}$ is a parameter meaning numerology, that is, subcarrier spacing of a PDSCH, which is a data channel, and $\mu_{PDCCH}$ is a parameter meaning numerology, that is, subcarrier spacing of a PDCCH, which is a control information channel. That is, it is a method of obtaining a slot index in a cell in which data are transmitted by calculating a slot index according to the subcarrier spacing.

Figure 8:
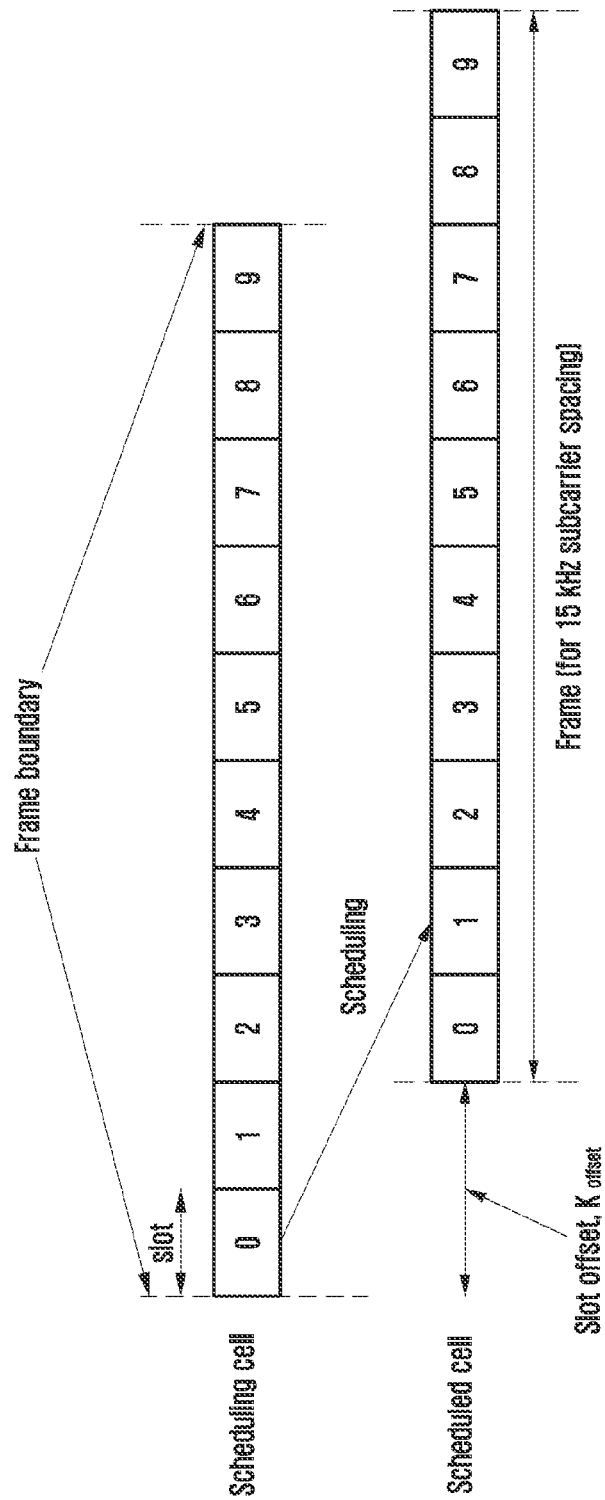
FIG. 8 is a diagram illustrating a case of CA in which frame boundaries between carriers do not match.

However, when the NR and LTE systems are operated in the same system, and the NR carrier and carriers that operate together the NR and LTE systems are bundled to allow the UE to operate with CA, frame boundaries between carriers may not match. CA in which frame boundaries do not match may be referred to as unaligned CA or asynchronous CA. These may be used or applied for various services and the like. FIG. 8 is a diagram illustrating a case of CA in which frame boundaries between carriers do not match.

In the above description, the $K_{offset}$ value, which is slot offset between carriers, may be a value configured to the UE through higher layer signaling. This may be a value transmitted to a specific UE through RRC signaling or to UEs through an SIB, which is system information. In this case, $K_{offset}$ may be a value in a symbol unit or a slot unit, and it is also possible to determine a $K_{offset}$ value from another configuration value. Here, the $K_{offset}$ value may be a positive number or a negative number. For example, the base station may notify or configure the difference between the frame boundaries to the UE as a value in units of Ts or Ts groups. Here, Ts is $T_c = 1/(\Delta f_{max} \cdot N_f)$, $\Delta f_{max} = 480 \cdot 10^3$ Hz, $N_f = 4096$, $\kappa = T_s/T_c = 64$, $T_s = 1(\Delta f_{ref} \cdot N_{f,ref})$, $\Delta f_{ref} = 15 \cdot 10^3$ Hz, and $N_{f,ref} = 2048$. The UE notified or that receives a configuration of the difference between frame boundaries in units of Ts, may determine the minimum number of symbols that may be included in a time period equal to or greater than the Ts time as $K_{offset}$. It may be determined that a UE which the $K_{offset}$ value has not been configured from the base station, that does not know the $K_{offset}$ value, or that is not notified or does not receive a configuration of CA in which the CA operation is not aligned or an unaligned CA may determine the $K_{offset}$ value to 0 or aligned CA or synchronous CA.

In the above description, the UE or the base station may determine an index of a slot in which data are transmitted in a cell which data are transmitted, based on a cell in which data are transmitted by scheduling or based on a slot index of a cell in which a control signal is transmitted by performing scheduling.

Method 1 is a method of determining an index of a slot in which data are transmitted based on a cell in which data are transmitted by scheduling. According to the method 1, an index of a slot in which data are transmitted may be calculated by the following method. When control information is transmitted in a slot n of the scheduling cell and K0, which is slot offset information between control information and data, is transmitted in the control information, data are transmitted in a slot $$\left\lfloor n \cdot \frac{2^{\mu_{PDSCH}}}{2^{\mu_{PDCCH}}} \right\rfloor + K_0.$$

in the scheduled cell.

In this case, in the case of a UE that has not been notified or configured that a CA operation between cells configured by the base station is unaligned CA or asynchronous CA, or a UE that has not been notified or configured that CA in which a CA operation is aligned or synchronized CA, an index of a slot transmitted in a cell in which data are transmitted is determined based on a cell in which scheduling information is transmitted, otherwise, the UE may determine based on a cell in which data are transmitted by scheduling, as in the above method 1.

Method 2 is a method of determining an index of a slot in which data are transmitted based on a slot index of a cell transmitting a control signal by performing scheduling. According to the method 2, an index of a slot in which data are transmitted may be calculated by the following method. When control information is transmitted in a slot n of a scheduling cell and K0, which is slot offset information between control information and data, is transmitted in the control information, data are transmitted in a slot n+K0+ Koffset in the scheduled cell. Alternatively, data may be transmitted in $$\left\lfloor n \cdot \frac{2^{\mu_{PDSCH}}}{2^{\mu_{PDCCH}}} \right\rfloor + K_0 + K_{offset}$$

in the scheduled cell.

Alternatively, an index of a slot in which data are transmitted may be determined in the following method.

When the UE is scheduled to receive PDSCH by a DCI, the Time domain resource assignment field value m of the DCI provides a row index m+1 to an allocation table. The determination of the used resource allocation table is defined. The indexed row defines the slot offset $K_0$, the start and length indicator SLIV, or directly the start symbol S and the allocation length L, and the PDSCH mapping type to be assumed in the PDSCH reception.

Given the parameter values of the indexed row:
The slot allocated for the PDSCH in the scheduled serving cell is $$\left\lfloor n \cdot \frac{2^{\mu_{PDSCH}}}{2^{\mu_{PDCCH}}} \right\rfloor + K_0,$$

where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively, and The starting symbol S relative to the start of the slot, and the number of consecutive symbols L counting from the symbol S allocated for the PDSCH are determined from the start and length indicator SLIV:

if (L−1)≤7 then $$SLIV=14 \cdot (L-1)+S$$

else $$SLIV=14 \cdot (14-L+1)+(14-1-S)$$

where 0<L≤14−S, and
The PDSCH mapping type is set to Type A or Type B as defined in sub-clause 7.4.1.1.2 of [4, TS 38.211].

Figure 9:
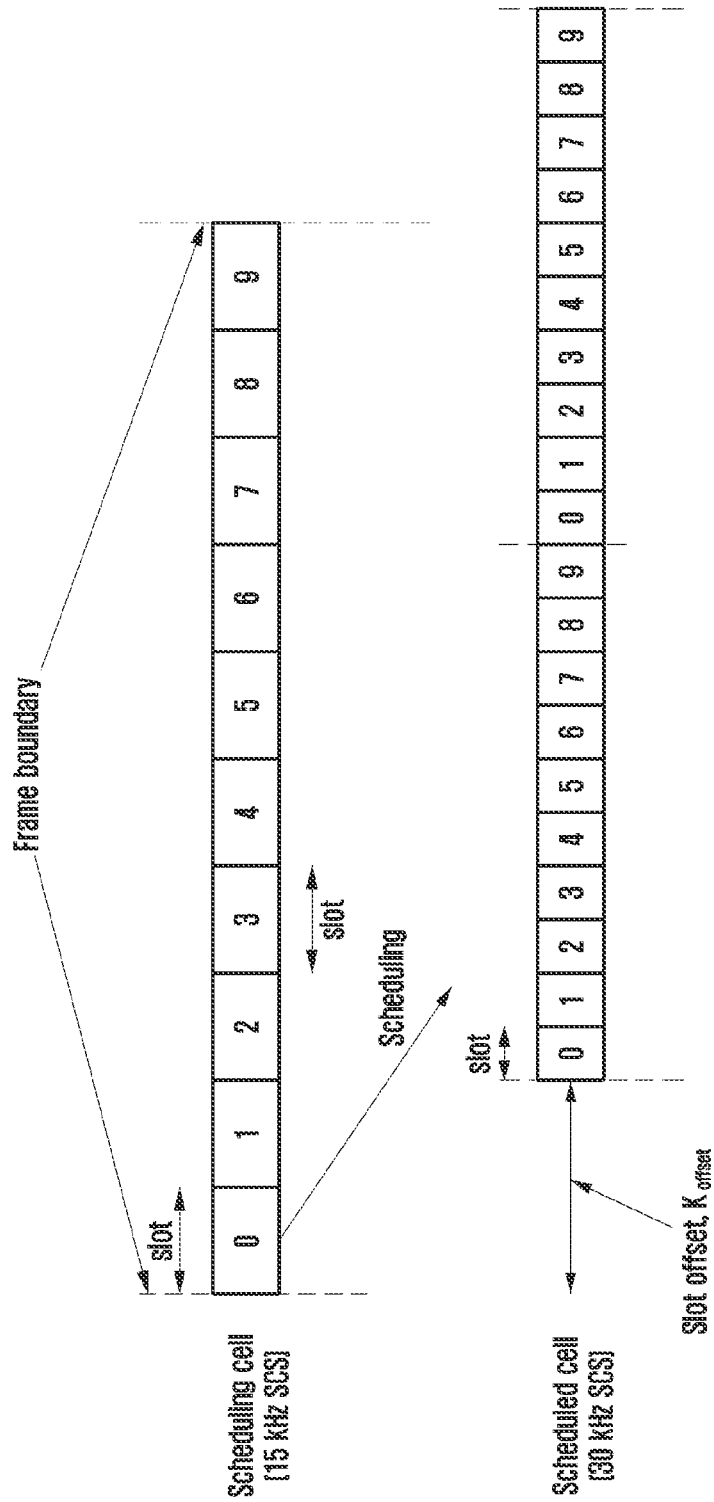
FIG. 9 is a diagram illustrating an example of a case in which subcarrier spacings (SCS) of a cell transmitting scheduling information and a cell in which scheduled data are transmitted are different from each other.
Figure 10:
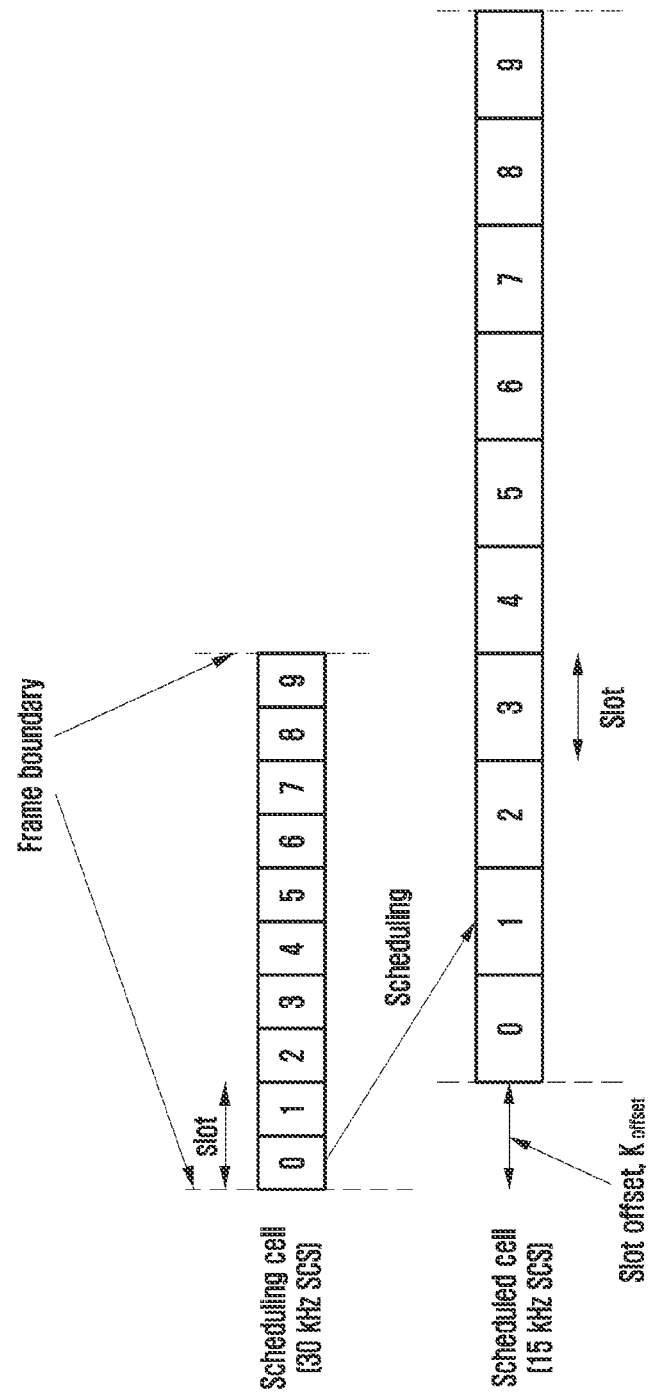
FIG. 10 is a diagram illustrating another example of a case in which subcarrier spacings (SCS) of a cell transmitting scheduling information and a cell in which scheduled data are transmitted are different from each other.

FIGS. 9 and 10 are diagrams illustrating an example of a case in which subcarrier spacings (SCS) of a cell transmitting scheduling information and a cell in which scheduled data are transmitted are different from each other.

As described above, when subcarrier spacings of a scheduling cell in which scheduling control information is transmitted and a scheduled cell in which scheduled data are transmitted are different from each other, a method of indicating slot offset between cells or carriers may be determined as follows.

Method 1: A slot offset $K_{offset}$ value is determined based on a slot length and index of a scheduling cell in which scheduling control information is transmitted, According to this method, the $K_{offset}$ value becomes 2 in FIGS. 9 and 10, respectively.

Method 2: The slot offset $K_{offset}$ value is determined based on a slot length and index of a scheduled cell in which scheduled data are transmitted. According to this method, the $K_{offset}$ value becomes 4 in FIG. 9 and the $K_{offset}$ value becomes 1 in FIG. 10.

Method 3: The slot offset $K_{offset}$ value may be determined according to a larger value of subcarrier spacings of a scheduling cell in which scheduling control information is transmitted and a scheduled cell in which scheduled data are transmitted. That is, the slot offset $K_{offset}$ value may be determined according to a shorter value of slot lengths of a scheduling cell in which scheduling control information is transmitted and a scheduled cell in which scheduled data are transmitted. According to this method, the $K_{offset}$ value becomes 4 in FIG. 9 and the $K_{offset}$ value becomes 2 in FIG. 10.

Method 4: The slot offset $K_{offset}$ value may be determined according to a smaller value of subcarrier spacings of a scheduling cell in which scheduling control information is transmitted and a scheduled cell in which scheduled data are transmitted. That is, the slot offset $K_{offset}$ value may be determined according to a longer value of slot lengths of a scheduling cell in which scheduling control information is transmitted and a scheduled cell in which scheduled data are transmitted. According to this method, the $K_{offset}$ value becomes 2 in FIG. 9 and the $K_{offset}$ value becomes 1 in FIG. 10.

Method 5: The slot offset $K_{offset}$ value may be configured or indicated to the UE according to subcarrier spacing or a slot length of a scheduling cell in which scheduling control information is transmitted. That is, in the cell, the offset may be configured to 2 when the subcarrier spacing is 15 kHz and be configured to 4 when the subcarrier spacing is 30 kHz.

Method 6: The slot offset $K_{offset}$ value may be configured or indicated to the UE according to subcarrier spacing or a slot length of a scheduled cell in which scheduled data are transmitted. That is, in the cell, the offset may be configured to 2 when the subcarrier spacing is 15 kHz, and be configured to 4 when the subcarrier spacing is 30 kHz.

Method 7: The slot offset $K_{offset}$ value may be configured or indicated based on specific subcarrier spacing, and when the subcarrier spacing of an actually operating cell is different, the slot offset value may be converted and applied.

Method 8: The slot offset may not be transmitted in the number of slots, but may be transmitted in units of absolute time values such as ms. That is, the slot offset may be a value transmitted in units of 1 ms or in units of 0.5 ms or 0.25 ms.

The above problem may be similarly solved in the uplink.

Specifically, in uplink data transmission, when control information including scheduling information is transmitted in a slot n of a scheduling cell and K2, which is slot offset information between control information and data, is transmitted in the control information, data in the scheduled cell are transmitted in a slot $$\left\lfloor n \cdot \frac{2^{\mu_{PUSCH}}}{2^{\mu_{PDCCH}}} \right\rfloor + K_2.$$

In the above description, $\mu_{PUSCH}$ is a parameter meaning numerology, that is, subcarrier spacing of a PUSCH, which is a data channel, and $\mu_{PDCCH}$ is a parameter meaning numerology, that is, subcarrier spacing of a PDCCH, which is a control information channel. That is, it is a method of obtaining a slot index in a cell in which data are transmitted by calculating a slot index according to the subcarrier spacing.

A $K_{offset}$ value, which is slot offset between carriers, may be a value configured to the UE through higher layer signaling. This may be a value transmitted to a specific UE through RRC signaling or to UEs through an SIB, which is system information.

In the above description, the base station or the UE may determine an index of a slot in which data are transmitted in a cell in which data are transmitted, based on a cell in which data are transmitted by being scheduled, as described above or may be determined based on a slot index of a cell that transmits a control signal by performing scheduling.

When an index of a slot in which data are transmitted is determined based on a cell that has been scheduled according to the method 1 to transmit data, the index of a slot in which data are transmitted may be calculated by the following method. When control information is transmitted in a slot n of the scheduling cell and K2, which is slot offset information between control information and data is transmitted in the control information, data are transmitted in a slot $$\left\lfloor n \cdot \frac{2^{\mu_{PUSCH}}}{2^{\mu_{PDCCH}}} \right\rfloor + K_2$$

in the scheduled cell.

When an index of a slot in which data are transmitted is determined based on a slot index of a cell transmitting the control signal by performing scheduling according to the method 2, the index of the slot in which data are transmitted may be calculated by the following method. When control information is transmitted in a slot n of the scheduling cell and K2, which is slot offset information between control information and data is transmitted in the control information, data in the scheduled cell are transmitted in a slot n+K2+Koffset.

Alternatively, this may be that data are transmitted in $$\left\lfloor n \cdot \frac{2^{\mu_{PUSCH}}}{2^{\mu_{PDCCH}}} \right\rfloor + K_2 + K_{offset}$$

in the scheduled cell.

Alternatively, the index of the slot in which data are transmitted may be determined in the following method.

When the UE is scheduled to transmit a transport block and no CSI report, or the UE is scheduled to transmit a transport block and a CSI report(s) on PUSCH by a DCL the Time domain resource assignment field value in of the Del provides a row index m+1 to an allocated table. The determination of the used resource allocation table is defined. The indexed row defines the slot offset $K_2$, the start and length indicator SLIV, or directly the start symbol S and the allocation length L, and the PUSCH mapping type to be applied in the PUSCH transmission.

When the UE is scheduled to transmit a PUSCH with no transport block and with a CSI report(s) by a CSI request field on a DCI, the Time-domain resource assignment field value m of the DCI provides a row index m+1 to an allocated table which is defined by the higher layer configured pusch-TimeDomainAllocationList in pusch-Config. The indexed row defines the start and length indicator SLIV, and the PUSCH mapping type to be applied in the PUSCH transmission and the $K_2$ value is determined as $$K_2 = \max_j Y_j(m+1),$$

where $Y_j$, j=0, ..., $N_{Rep}$−1 are the corresponding list entries of the higher layer parameter reportSlotOffsetList CSI-ReportConfig for the $N_{rep}$ triggered CSI Reporting Settings and $Y_j(m+1)$ is the (m+1)th entry of $Y_j$.

The slot where the UE shall transmit the PUSCH in the scheduled serving cell is determined by K2 as $$\left\lfloor n \cdot \frac{2^{\mu_{PUSCH}}}{2^{\mu_{PDCCH}}} \right\rfloor + K_2$$

where n is the slot with the scheduling DCI, K2 is based on the numerology of PUSCH, and $\mu_{PUSCH}$ and $\mu_{PDCCH}$ are the subcarrier spacing configurations for PUSCH and PDCCH, respectively, and The starting symbol S relative to the start of the slot, and the number of consecutive symbols L counting from the symbol S allocated for the PUSCH are determined from the start and length indicator SLIV of the indexed row:
if (L−1)≤7 then $SLIV=14 \cdot (L-1)+S$ else $SLIV=14 \cdot (14-L+1)+(14-1-S)$ where 0<L≤14−S, and The PUSCH mapping type is set to Type A or Type B as defined in Subclause 6.4.1.1.3 of [4 TS 38.211] as given by the indexed row.

The above problem may be similarly solved even in a situation of aperiodic CSI reporting as follows. Even in the aperiodic channel state information reporting situation, a position of a slot in which reporting is performed may be configured in consideration of offset.

For CSI-RS resource sets associated with Resource Settings configured with the higher layer parameter resourceType set to 'aperiodic', 'periodic', or 'semi-persistent', trigger states for Reporting Setting(s) (configured with the higher layer parameter reportConfigType set to 'aperiodic') and/or Resource Setting for channel and/or interference measurement on one or more component carriers are configured using the higher layer parameter CSI-AperiodicTriggerStateList. For aperiodic CSI report triggering, a single set of CSI triggering states are higher layer configured, wherein the CSI triggering states can be associated with any candidate DL BWP. A UE is not expected to receive more than one DCI with non-zero CSI request per slot. A UE is not expected to be configured with different TCI-StateId's for the same aperiodic CSI-RS resource ID configured in multiple aperiodic CSI-RS resource sets with the same triggering offset in the same aperiodic trigger state. A UE is not expected to receive more than one aperiodic CSI report request for transmission in a given slot. A UE is not expected to be triggered with a CSI report for a non-active DL BWP. A trigger state is initiated using the CSI request field in DCI.

When all the bits of CSI request field in DCI are set to zero, no CSI is requested.

When the number of configured CSI triggering states in CSI-AperiodicTriggerStateList is greater than $2^{N_{TS}}-1$, where $N_{TS}$ is the number of bits in the DCI CSI request field, the UE receives a subselection indication, as described in subclause 6.1.3.13 of [10, TS 38.321], used to map up to $2^{N_{TS}}-1$ trigger states to the codepoints of the CSI request field in DCI. $N_{TS}$ is configured by the higher layer parameter reportTriggerSize where $N_{TS} \in \{0,1,2,3,4,5,6\}$. When the HARQ/ACK corresponding to the PDSCI-I carrying the subselection indication is transmitted in the slot n, the corresponding action in [10, TS 38.321] and UE assumption on the mapping of the selected CSI trigger state(s) to the codepoint(s) of DCI CSI request field shall be applied starting from the first slot that is after slot n+$3N_{slot}^{subframe,\mu}$.

The above-described methods may be operated in combination with each other. In the above description, the slot offset value may be a negative number, and in this case, it may be the case in which a slot N of a scheduled cell in which scheduled data of the same frame number are transmitted appears earlier on the time axis than a slot N of a scheduling cell in which scheduling control information is transmitted.

In the above description, the slot offset value may be configured only by UEs supporting CA in which frame boundaries do not match, not all UEs. As described above, it may be a capability of the UE to support CA in which frame boundaries do not match, and such a capability of the UE may be transmitted to the base station in a process of exchanging information with the base station.

In the above description, in the case of downlink data transmission, a method for determining in which slot data are transmitted has been described, but this method may be used as a method for determining in which slot data should be transmitted even in the case of uplink data transmission.

Figure 11:
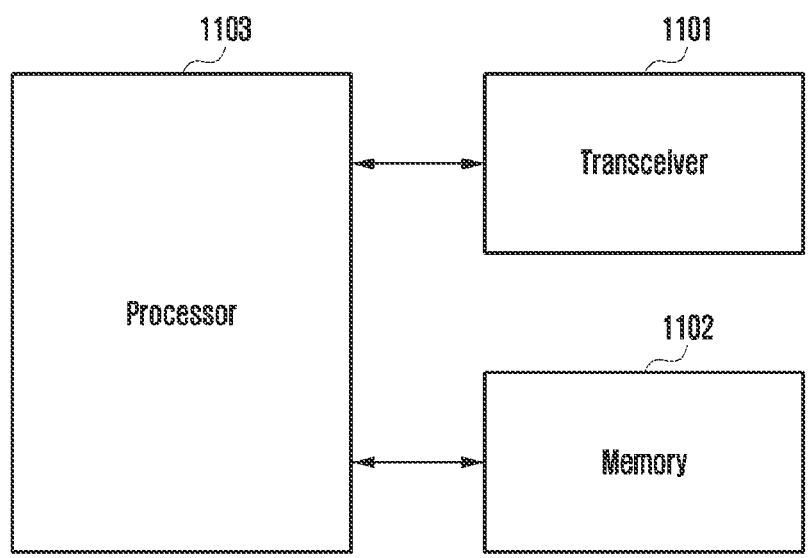
FIG. 11 is a block diagram illustrating an internal structure of a terminal according to an embodiment of the disclosure.
Figure 12:
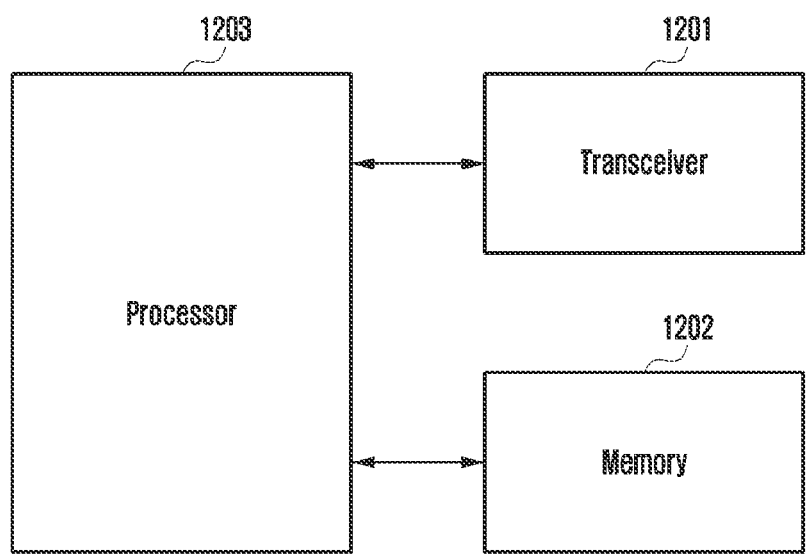
FIG. 12 is a block diagram illustrating an internal structure of a base station according to an embodiment of the disclosure.

In order to perform the above-described embodiments of the disclosure, transceivers, memories, and processors of the UE and the base station are illustrated in FIGS. 11 and 12, respectively. The transceivers, the memories, and the processors of the base station and the UE, respectively should operate according to an embodiment.

FIG. 11 illustrates a structure of a UE according to an embodiment of the disclosure.

With reference to FIG. 11, the UE may include a transceiver 901, a memory 902, and a processor 903. However, the components of the UE are not limited to the above-described examples. For example, the UE may include more or fewer components than the aforementioned components. Further, the transceiver 901, the memory 902, and the processor 903 may be implemented in the form of a single chip.

According to an embodiment of the disclosure, the transceiver 901 may transmit and receive a signal to and from the base station. The above-described signal may include control information and data. To this end, the transceiver 901 may include an RF transmitter for up-converting and amplifying a frequency of a signal to be transmitted, and an RF receiver for low-noise amplifying a received signal and down-converting a frequency of thereof. Further, the transceiver 901 may receive a signal through a wireless channel and output the signal to the processor 903, and transmit the signal output from the processor 903 through a wireless channel.

According to an embodiment of the disclosure, the memory 902 may store programs and data necessary for an operation of the UE. Further, the memory 902 may store control information or data included in a signal transmitted and received by the UE. The memory 902 may be configured with a storage medium or a combination of storage media, such as a ROM, RAM, hard disk, CD-ROM, and DVD. Further, the memory 902 may be configured with a plurality of memories. According to an embodiment of the disclosure, the memory 902 may store a program for controlling and receiving an operation for reducing power consumption of the UE.

FIG. 12 illustrates a structure of a base station according to an embodiment of the disclosure. With reference to FIG. 12, the base station may include a transceiver 1001, a memory 1002, and a processor 1003. However, the components of the base station are not limited to the above-described example. For example, the UE may include more or fewer components than the aforementioned components. Further, the transceiver 1001, the memory 1002, and the processor 1003 may be implemented in the form of a single chip.

According to an embodiment of the disclosure, the transceiver 1001 may transmit and receive a signal to and from the UE. The above-described signal may include control information and data. To this end, the transceiver 1001 may include an RF transmitter for up-converting and amplifying a frequency of a signal to be transmitted, and an RF receiver for low-noise amplifying a received signal and down-converting a frequency of thereof. Further, the transceiver 1001 may receive a signal through a wireless channel, output the signal to the processor 1003, and transmit the signal output from the processor 1003 through a wireless channel.

According to an embodiment of the disclosure, the memory 1002 may store programs and data necessary for an operation of the base station. Further, the memory 1002 may store control information or data included in a signal transmitted and received by the base station. The memory 1002 may be configured with a storage medium or a combination of storage media, such as a ROM, RAM, hard disk, CD-ROM, and DVD. Further, the memory 1002 may be configured with a plurality of memories. According to an embodiment of the disclosure, the memory 1002 may store a program of the base station for generating and transmitting control information for reducing power consumption of the bUE.

Methods according to the embodiments described in the claims or specifications of the disclosure may be implemented in the form of hardware, software, or a combination of hardware and software.

When implemented in software, a computer readable storage medium or computer program product storing one or more programs (software modules) may be provided. One or more programs stored in the computer readable storage medium or computer program product are configured for execution by one or more processors in an electronic device. The one or more programs include instructions for causing an electronic device to execute methods according to embodiments described in a claim or specification of the disclosure.

Such programs (software modules, software) may be stored in a random access memory, a nonvolatile memory including a flash memory, a read only memory (ROM), an electrically erasable programmable ROM (EEPROM), a magnetic disc storage device, a compact disc-ROM (CD-ROM), digital versatile discs (DVDs), any other form of optical storage device, or a magnetic cassette. Alternatively, the programs may be stored in a memory configured with a combination of some or all thereof. Further, each configuration memory may be included in the plural.

Further, the program may be stored in an attachable storage device that may access through a communication network such as the Internet, Intranet, local area network (LAN), wide LAN (WLAN), or storage area Network (SAN), or a communication network configured with a combination thereof. Such a storage device may access to a device implementing an embodiment of the disclosure through an external port. Further, a separate storage device on the communication network may access to the device implementing the embodiment of the disclosure.

In the specific embodiments of the disclosure described above, elements included in the disclosure are represented in the singular or plural according to the presented specific embodiments. However, the singular or plural expression is appropriately selected for a situation presented for convenience of description, and the disclosure is not limited to the singular or plural element, and even if a component is represented in the plural, it may be configured with the singular, or even if a component is represented in the singular, it may be configured with the plural.

Embodiments of the disclosure disclosed in the present specification and drawings merely present specific examples in order to easily explain the technical contents of the disclosure and help the understanding of the disclosure, and are not intended to limit the scope of the disclosure. That is, it will be apparent to those of ordinary skill in the art to which the disclosure pertains that other modifications based on the technical spirit of the disclosure can be implemented. Further, each of the above embodiments may be operated in combination with each other, as needed. For example, the base station and the UE may be operated by combining parts of an embodiment and another embodiment of the disclosure with each other. Further, the embodiments of the disclosure are applicable to other communication systems, and other modifications based on the technical spirit of the embodiments may also be implemented. For example, embodiments may be applied to LTE systems, 5G or NR systems, and the like.

The invention claimed is:

1. A method performed by a terminal in a communication system, the method comprising:
receiving, via higher layer signaling, first slot offset information for a first slot offset between two cells for carrier aggregation with un-aligned frame boundaries;
receiving, in a first slot of a scheduling cell, downlink control information (DCI) scheduling data;
identifying a second slot offset based on the DCI;
identifying a second slot of a scheduled cell for the data based on the first slot of the scheduling cell, the first slot offset, and the second slot offset; and
communicating the data in the second slot of the scheduled cell.

2. The method of claim 1, wherein the second slot of the scheduled cell is identified based on a subcarrier spacing of the scheduling cell and a subcarrier spacing of the scheduled cell.

3. The method of claim 1, wherein the first slot offset information is based on a specific subcarrier spacing.

4. The method of claim 1, wherein a value of the first slot offset information is available to be a negative number and a positive number.

5. The method of claim 1, wherein the scheduling cell and the scheduled cell are configured for the carrier aggregation.

6. A method performed by a base station in a communication system, the method comprising:
transmitting, via higher layer signaling, first slot offset information for a first slot offset between two cells for carrier aggregation with un-aligned frame boundaries;
transmitting, in a first slot of a scheduling cell, downlink control information (DCI) scheduling data; and
communicating the data in a second slot of a scheduled cell,
wherein the second slot is indicated based on the first slot of the scheduling cell, the first slot offset, and a second slot offset indicated based on the DCI.

7. The method of claim 6, wherein the second slot of the scheduled cell is indicated based on a subcarrier spacing of the scheduling cell and a subcarrier spacing of the scheduled cell.

8. The method of claim 6, wherein the first slot offset information is based on a specific subcarrier spacing.

9. The method of claim 6, wherein a value of the first slot offset information is available to be a negative number and a positive number.

10. The method of claim 6, wherein the scheduling cell and the scheduled cell are configured for the carrier aggregation.

11. A terminal in a communication system, the terminal comprising:
a transceiver; and
a processor coupled with the transceiver and configured to:
receive, via higher layer signaling, first slot offset information for a first slot offset between two cells for carrier aggregation with un-aligned frame boundaries,
receive, in a first slot of a scheduling cell, downlink control information (DCI) scheduling data,
identify a second slot offset based on the DCI,
identify a second slot of a scheduled cell for the data based on the first slot of the scheduling cell, the first slot offset, and the second slot offset, and
communicate the data in the second slot of the scheduled cell.

12. The terminal of claim 11, wherein the second slot of the scheduled cell is identified based on a subcarrier spacing of the scheduling cell and a subcarrier spacing of the scheduled cell.

13. The terminal of claim 11, wherein the first slot offset information is based on a specific subcarrier spacing.

14. The terminal of claim 11, wherein a value of the first slot offset information is available to be a negative number and a positive number.

15. The terminal of claim 11, wherein the scheduling cell and the scheduled cell are configured for the carrier aggregation.

16. A base station in a communication system, the base station comprising:
a transceiver; and
a processor coupled with the transceiver and configured to:
transmit, via higher layer signaling, first slot offset information for a first slot offset between two cells for carrier aggregation with un-aligned frame boundaries,
transmit, in a first slot of a scheduling cell, downlink control information (DCI) scheduling data, and
communicate the data in a second slot of scheduled cell,
wherein the second slot is indicated based on the first slot of the scheduling cell, the first slot offset, and the second slot offset indicated based on the DCI.

17. The base station of claim 16, wherein the second slot of the scheduled cell is indicated based on a subcarrier spacing of the scheduling cell and a subcarrier spacing of the scheduled cell.

18. The base station of claim 16, wherein the first slot offset information is based on a specific subcarrier spacing.

19. The base station of claim 16, wherein a value of the first slot offset information is available to be a negative number and a positive number.

20. The base station of claim 16, wherein the scheduling cell and the scheduled cell are configured for the carrier aggregation.

* * * * *